US006407885B1

(12) United States Patent
Ahagon et al.

(10) Patent No.: US 6,407,885 B1
(45) Date of Patent: Jun. 18, 2002

(54) THIN FILM MAGNETIC HEAD AND METHOD FOR FABRICATING SAME

(75) Inventors: Akira Ahagon; Masaya Sakaguchi; Hiroyasu Tsuji; Satoru Mitani, all of Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/536,368

(22) Filed: Mar. 28, 2000

(30) Foreign Application Priority Data

Apr. 2, 1999 (JP) .............................. 11-096329

(51) Int. Cl.⁷ ............................................. G11B 5/147
(52) U.S. Cl. ....................................... 360/126; 360/317
(58) Field of Search .................... 360/126, 122, 360/317

(56) References Cited

U.S. PATENT DOCUMENTS 6,172,848 B1 * 1/2001 Santini ...................... 360/126

FOREIGN PATENT DOCUMENTS

JP         10-334409        12/1998

* cited by examiner

Primary Examiner—Robert S. Tupper
(74) Attorney, Agent, or Firm—Ratner & Prestia

(57) ABSTRACT

A thin film magnetic head that provides, despite a narrow head track width, strong recording magnetic fields and demonstrates a sufficiently high recording capability for the high Hc recording media. The lower magnetic pole is formed with a lower write chip section and a shared shield section, while the upper magnetic pole is formed with an upper write chip section and a yoke section. The lower and upper write chip sections are made of a high Bs magnetic material, the yoke section is made of a high ρ magnetic material, and the shared shield section is made of permalloy or the like magnetic material. The upper write chip section is longer than the lower write chip section (which corresponds to the head gap depth); this configuration makes the contact area with the yoke section greater, even if the head track width is narrow, and provides strong recording magnetic fields.

8 Claims, 24 Drawing Sheets

THIN FILM MAGNETIC HEAD AND METHOD FOR FABRICATING SAME

FIELD OF THE INVENTION

The present invention relates to a thin film magnetic head for writing and reading information at a high density in and out of a hard disk drive (HDD) or the like magnetic recording medium. It also contains method for fabricating the thin film magnetic head.

BACKGROUND OF THE INVENTION

In order to meet the growing needs for increasing the recording capacity in a hard disk drive and the like magnetic recording medium, intensive efforts are being made to increase the recording density.

A conventional thin film magnetic head is described in the following with reference to drawings.

A thin film magnetic head as shown in FIG. 46, or a so-called MR inductive complex head, is one of the popular writing/reading heads used in the HDDs. A first combined structure 4605, which is constituted with a magneto-resistive (MR) film, or a giant magneto-resistive (GMR) film 4602, formed on a lower shield section 4601, a hard film 4603 formed at both sides of the film 4602, and an electrode 4604 formed above the hard film 4603 in the form of a film stretching towards rear portion, is reading section for reproducing signals stored in a magnetic recording medium. A second combined structure 4612, which is constituted with lower magnetic pole formed of a shared shield section 4606 and a lower write chip section 4607, a coil 4608 formed above with an insulation layer (not shown) interposed, and upper magnetic pole formed of an upper write chip 4609 and a yoke 4610, the lower write chip 4607 and the upper write chip 4609 being disposed opposing to each other, is writing section for writing signals in a magnetic recording medium. The "common" shield 4606 is so named because it is part of the lower magnetic pole of the writing section, at the same time it functions as shield for the reading section.

The second combined structure 4612, or the writing section, is described next referring to FIG. 47. On the shared shield section 4701, the lower write chip section 4702, a gap section 4703, an upper write chip section 4704, a first layer coil 4705, a second layer coil 4706, and a yoke section 4707 are stacked in the order by a sputtering or the like thin film forming process. The lower write chip section 4702 and the upper write chip section 4704 are generally formed with a magnetic material having a high saturation magnetic flux density (Bs), while the yoke section 4707 is generally formed with a magnetic material having a high resistivity ($\rho$). The gap section 4703 is formed with $SiO_2$ or the like insulating material, the coils 4705, 4706 are formed with a copper or the like conductive material. A space formed by the opposing shared shield section 4701 and yoke section 4707, in which the coils 4705 and 4706 are disposed, is filled with an insulating material 4708. The coils 4705, 4706 are winding around the yoke section 4707 in the rear portion where it makes contact with the shared shield section 4701. The coils 4705, 4706 generate magnetic fields, when provided with electricity, in the outside of the gap section 4703 to write signals in a magnetic recording medium. Hereunder, the writing section will be referred to as thin film magnetic head.

In the conventional thin film magnetic head, where the upper write chip section and the yoke section, these constitute the upper magnetic pole, are making contact only in a region of the head track width and the head gap depth, the upper write chip section is not supplied with sufficient magnetic flux from the yoke section. Even if the saturation magnetic flux density (Bs) is enhanced with the upper write chip section and the lower write chip section it is difficult for the writing magnetic fields to go stronger because of influence by the magnetic saturation. Problem is that the writing magnetic fields are not strong enough for recording signals in a high coercive force (Hc) recording medium, which has been making a significant advance for high density recording. While on the other hand, if the head track width is made smaller for the higher recording density, the contact region between the upper write chip section and the yoke section goes smaller, and the recording magnetic fields eventually go even weaker. Thus the effectiveness on the high Hc recording medium is retarded.

SUMMARY OF THE INVENTION

A thin film magnetic head of the present invention comprises a lower magnetic pole including a shared shield section and a lower write chip section made of a high Bs magnetic layer disposed on the upper surface of the shared shield section at the tip end portion; a gap section formed on the upper surface of the lower write chip section; an upper magnetic pole including an upper write chip section made of a high Bs magnetic layer disposed on the gap section, opposing to the lower write chip section, and a yoke section made of a high $\rho$ magnetic layer that makes contact in a part with the lower magnetic pole while coupled at the tip end portion with the upper write chip section; and a coil winding around going through a space formed by the opposing magnetic poles, in a region between the both magnetic poles' contact area and the upper write chip section, and a space behind the yoke section. Wherein, the upper write chip section is longer than the lower write chip section in the direction of the depth.

Under the above-described configuration, where the upper write chip section is longer than the lower write chip section, area of contact between the upper write chip section and the yoke section can be increased. Therefore, strong recording magnetic fields are made available with sufficient supply of magnetic flux from the yoke section. Furthermore, the yoke section of the upper magnetic pole made of a high $\rho$ magnetic layer provides favorable high frequency characteristics.

A preferred example of the thin film magnetic head in accordance with the present invention is that the width of yoke is made greater in a region coupling with the upper write chip section than the head track width formed by the upper write chip section and the lower write chip section. The greater width of the yoke section, which is formed of the high $\rho$ magnetic layer, eases the magnetic saturation at the tip end of yoke, and a plenty amount of magnetic flux is supplied to the tip end of the yoke section. Thus, strong recording magnetic fields are made available through the upper write chip section to an improved recording efficiency.

Other exemplary thin film magnetic head of the present invention is that the end surface at the tip end of the yoke section coupled to the upper write chip section is locating inward relative to the end face of the upper write chip section. This configuration suppresses the fringe at the head gap section, and enables to reduce the track pitch for an increased surface recording density.

Still other example of thin film magnetic head is that it is provided with a shared shield section that has a hollow in an area corresponding to the coil. This configuration reduces inductance of a magnetic pole formed by the upper magnetic pole and the lower magnetic pole, and the high frequency characteristics may be improved.

A method for fabricating a thin film magnetic head of the present invention comprises a first step for forming an insulating layer on the flat upper surface of a shared shield section; a second step of dry-etching the insulating layer for exposing the upper surface of the shared shield section so that an edge line of the insulating layer after the dry-etching assumes a straight line shape; a third step for forming a lower high Bs magnetic layer on the exposed upper surface of the shared shield section and the upper surface of the insulating layer; a fourth step of polishing the upper surface of the insulating layer and the upper surface of the lower high Bs magnetic layer to be in parallel with the upper surface of the shared shield section; a fifth step for forming a gap layer on the upper surfaces of the lower high Bs magnetic layer and the insulating layer polished at the fourth step; a sixth step for forming an upper high Bs magnetic layer on the upper surface of the gap layer; a seventh step for forming a structure having a specific head track width, by dry-etching the insulating layer, the lower high Bs magnetic layer, the gap layer and the upper high Bs magnetic layer altogether at once; an eighth step for forming an insulating underlayer over the exposed upper surface of the shared shield section and the upper surface, the left and the right sides and the front and the rear surfaces of the structure; a ninth step for forming a first coil layer by plating on the upper surface of the insulating underlayer behind the structure so that the coil thickness approximately matches the upper surface of the insulating underlayer on the structure; a tenth step for forming a lower insulating layer over the first coil layer; an eleventh step of polishing the whole area flat in parallel to the upper surface of the shared shield section so that the upper high Bs magnetic layer of the structure and the first coil layer are exposed; a twelfth step of dry-etching for removing the lower insulating layer and the insulating underlayer so that the shared shield section is exposed at the central area of the first coil layer; a thirteenth step for forming an intermediary insulating layer using a photoresist so that the exposed upper high Bs magnetic layer and the exposed area of the shared shield section exposed at the twelfth step are kept in their exposed state and a hole is provided on the innermost winding of the first coil layer; a fourteenth step of plating a second coil layer on the intermediary insulating layer so that the innermost winding locates on the hole provided on the innermost winding of the first coil layer; a fifteenth step for forming an upper insulating layer using a photoresist so that the second coil layer is covered while the exposed upper high Bs magnetic layer and the exposed state of the shared shield section are approximately maintained as they are; a sixteenth step of forming a high $\rho$ magnetic layer on the upper surface of the body provided through the fifteenth step; and a seventeenth step for forming a yoke section using a dry-etching process so that the width of the high $\rho$ magnetic layer is identical to, or greater than, width of the upper high Bs magnetic layer in a region making contact with the upper high Bs magnetic layer, while the width in the rear portion is greater than that of the upper high Bs magnetic layer.

With the above-described fabricating method, where the lower high Bs magnetic layer, the gap layer and the upper high Bs magnetic layer are stacked one after the other in the order, and then these layers altogether undergo a process step for forming a certain track width, a narrow track width is made available at a high precision level. This enables to make the track pitch narrower, and makes a significant contribution to an improved surface recording density.

Furthermore, it is easy to provide an upper high Bs magnetic layer that is longer than a lower high Bs magnetic layer, because in the above-described fabricating method the lower high Bs magnetic layer and the insulating layer are disposed in series and the upper high Bs magnetic layer is formed on it with a gap layer interposed. Thus the contact area with a yoke section is increased, and a thin film magnetic head of strong recording magnetic fields is implemented.

DESCRIPTION OF THE PREFERRED EMBODIMENTS

Preferred embodiments of the present invention are described in the following with reference to the drawings.
(Embodiment 1)

Figure 1:
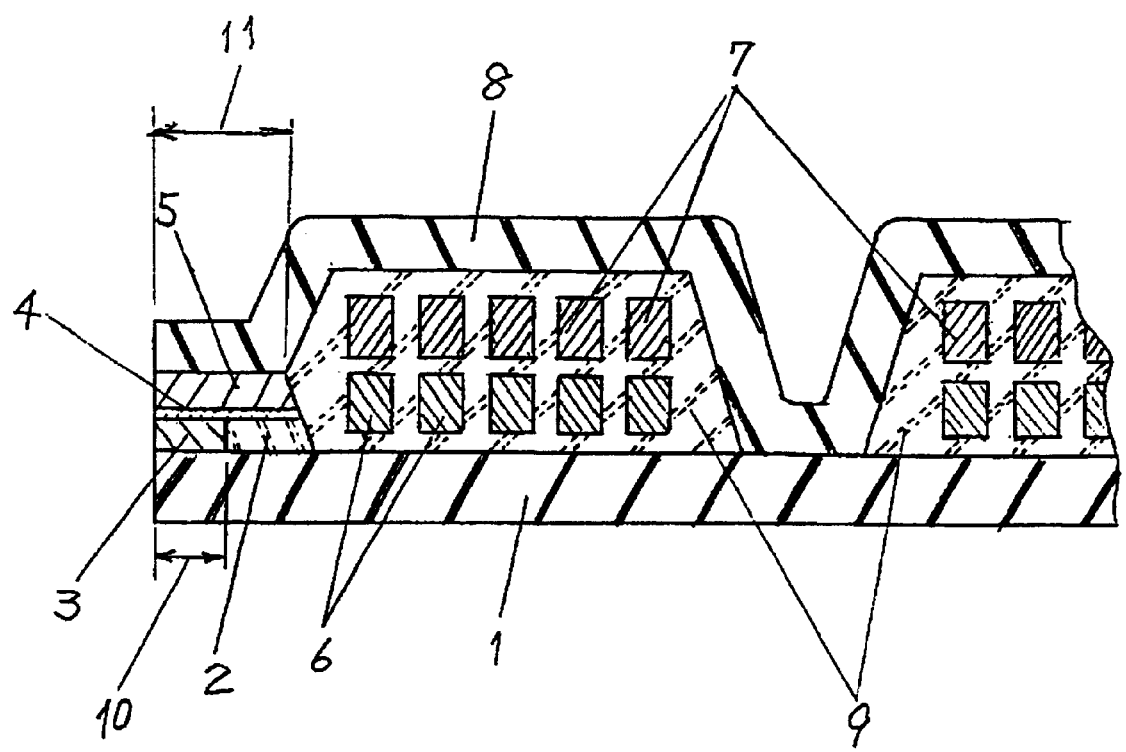
FIG. 1 is a cross sectional view of a thin film magnetic head in a first embodiment of the present invention.
Figure 2:
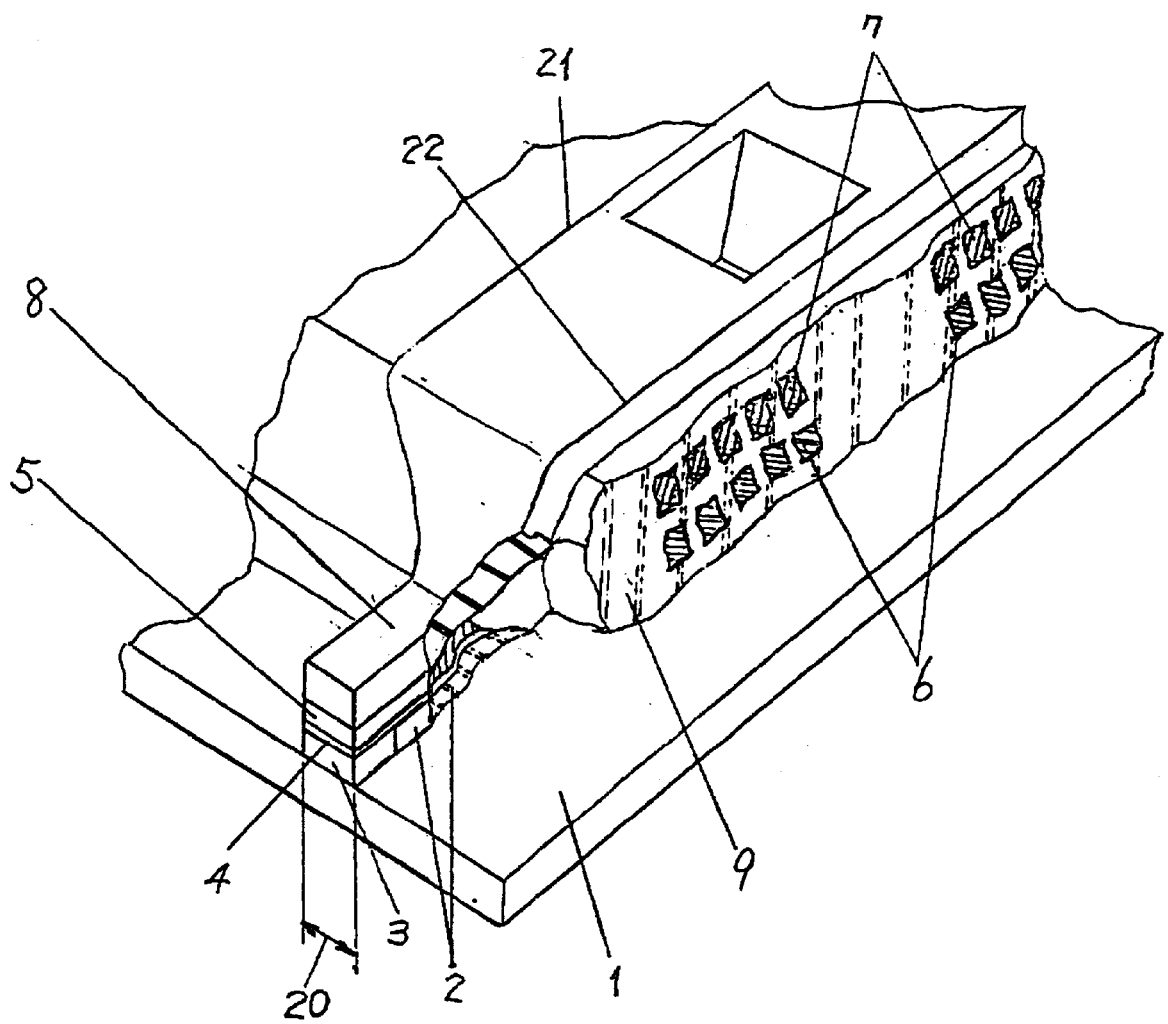
FIG. 2 is a perspective view of the thin film magnetic head sectioned at the right side.

FIG. 1 and FIG. 2 illustrate the structural outline of a thin film magnetic head in accordance with a first exemplary embodiment of the present invention. FIG. 1 is a cross sectional view of the thin film magnetic head sectioned along the central line; FIG. 2 is a partially sectioned perspective view of the thin film magnetic head.

In FIG. 1, on the upper surface at the tip end of a shared shield section 1 made of permalloy, a Co system amorphous or the like material, a front insulating layer 2 of $Al_2O_3$, or $SiO_2$, etc. and a lower write chip section 3, which is a high Bs magnetic layer of FeN or the like material, are stacked in the order; the shared shield section 1 and the lower write chip section 3 form a lower magnetic pole. A gap section 4 of $Al_2O_3$, $SiO_2$, etc. is formed on the front insulating layer 2 and the lower write chip section 3, and an upper write chip section 5, which is a high Bs magnetic layer of FeN, etc., is formed opposing to the lower write chip section 3 on the upper surface of the gap section 4. A first layer coil 6 and a second layer coil 7 of copper, Al, etc. are formed. A yoke section 8, which is a high ρ magnetic layer of FeMgO, etc., is making contact at the tip end with the upper write chip section 5, while at the other region with the shared shield section 1. The write chip section 5 and the yoke section 8 constitute an upper magnetic pole. The first layer coil 6 and the second layer coil 7 wind around the yoke section 8 at the vicinity of a region where it makes contact with the shared shield section 1. A space formed by the opposing shared shield section 1 and yoke section 8 and housing the first layer coil 6 and the second layer coil 7 is filled with an insulating substance 9 made of $Al_2O_3$, $SiO_2$, etc.

As shown in FIG. 2, width of the yoke section 8 at the tip end making contact with the upper write chip section 5 is approximately identical to the head track width 20 formed by the upper write chip section 5 and the lower write chip section 3. While in the rear portion behind the tip end, where it is making contact with the upper write chip section 5, the yoke section 8 has a width that is greater than the head track width 20. Therefore, magnetic flux is efficiently generated by the first layer coil 6 and the second layer coil 7.

The length 11 in the direction of depth of the upper write chip section 5 is longer than the depth (head gap depth 10) of the lower write chip 3. This structure increases the area of contact between the upper write chip section 5 of high Bs magnetic layer and the yoke section 8; as the result, a sufficient amount of magnetic flux is provided from the yoke section 8 to generate strong recording magnetic fields. Even when the head track width 20 is reduced, strong magnetic fields can be secured by the increased contact region. Furthermore, since the yoke section 8 is formed of a high ρ magnetic layer, the high frequency characteristics are improved, contributing to an enhanced linear recording density.

The front insulating layer 2, the lower write chip section 3, the gap section 4 and the upper write chip section 5 are stacked on the shared shield section 1 one after the other in the order, and then these layers are dry-etched altogether at once. Therefore even a narrow head track width 20 can be formed precisely at a high precision level.

Figure 3:
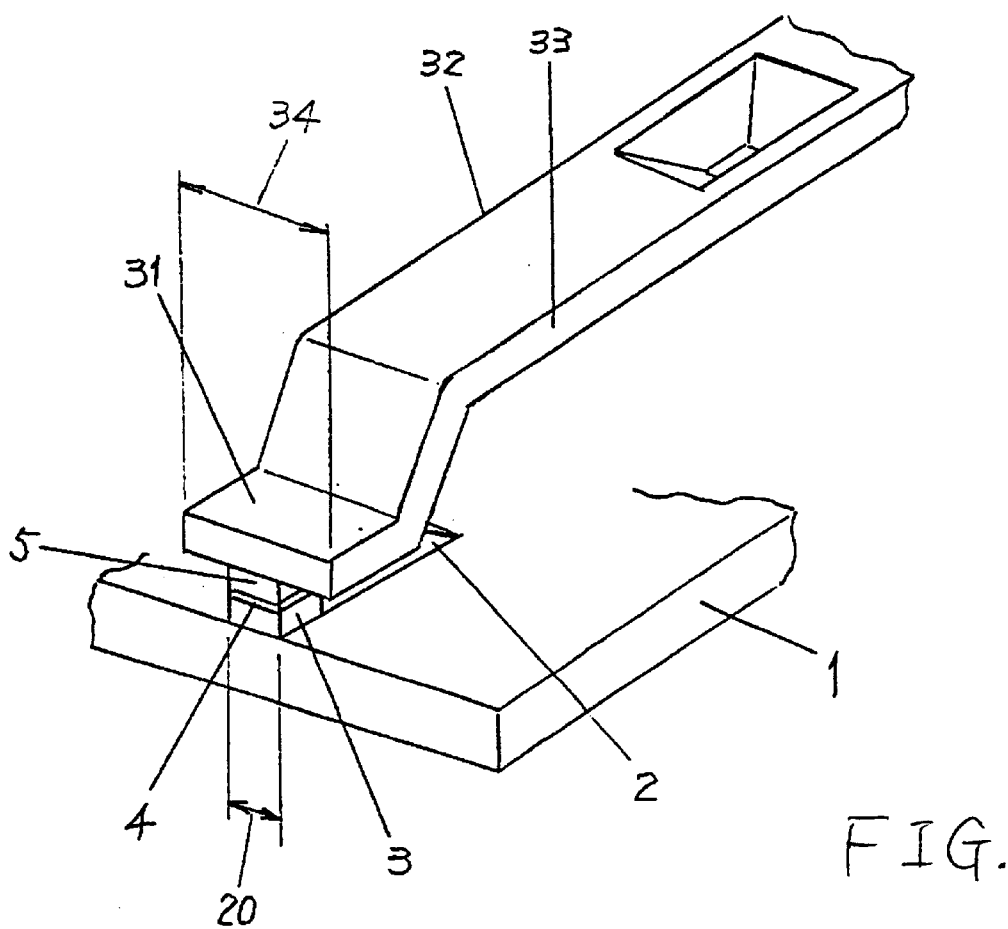
FIG. 3 is a perspective view used to describe a modification of the thin film magnetic head.

FIG. 3 shows a modification in the tip end portion of the thin film magnetic head. The broadened width 34 of the yoke section 31, relative to the head track width 20, provides the high magnetic flux sufficiently to the yoke section 31 up to the tip end. Thus the upper write chip section 5 made of high Bs magnetic layer can generate stronger magnetic fields.

Although the pair of side surfaces (left surface 21, right surface 22) in the hind portion of yoke section 8 in FIG. 2 and the pair of side surfaces (left surface 32, right surface 33) in FIG. 3 are described respectively to be approximately parallel to each other, it is not intended to specify the side surfaces should be parallel to each other; the essential point is that it has a width that is broader than the head track width 20.

Figure 4:
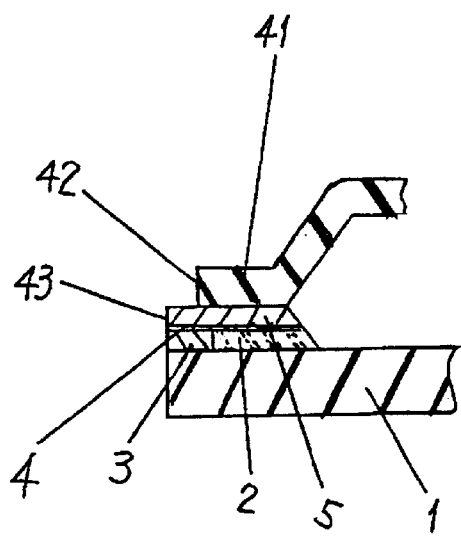
FIG. 4 is a perspective view used to describe another modification of the thin film magnetic head.

FIG. 4 shows still other exemplary modification of the thin film magnetic head. End face 42 of the yoke section 41 at the tip end is locating behind relative to the tip end surface 43 of the upper write chip section 5. This configuration suppresses the fringe, and enables a reduced recording track pitch. Therefore, the area recording density may be improved.

(Embodiment 2)

Figure 5:
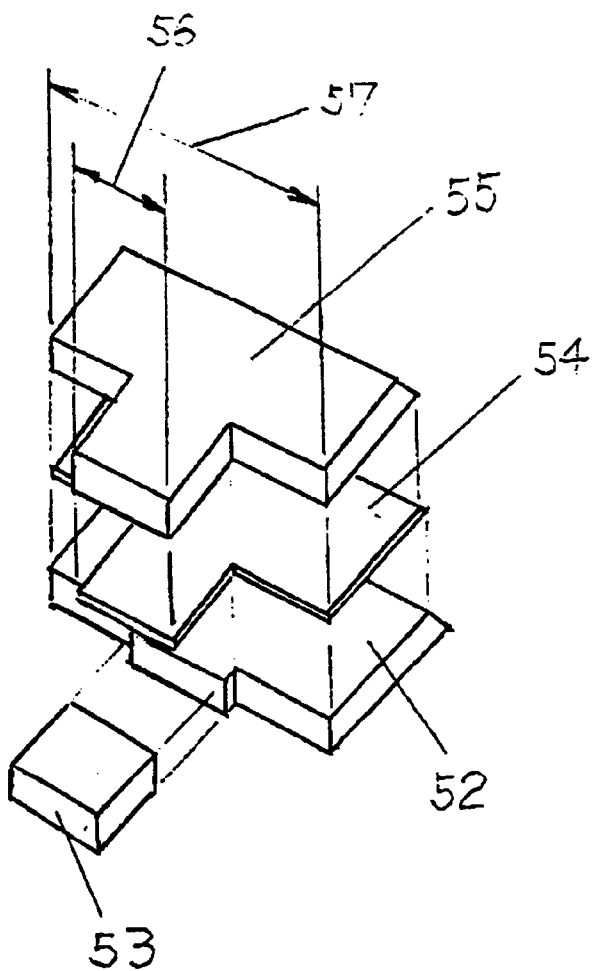
FIG. 5 is an exploded perspective view showing a write chip section of thin film magnetic head in a second embodiment of the present invention.
Figure 6:
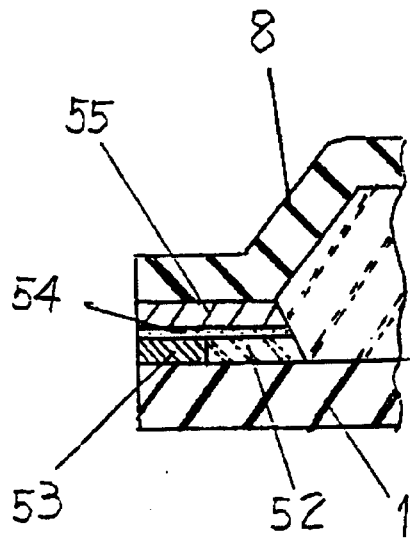
FIG. 6 is a cross sectional view of the write chip section.
Figure 7:
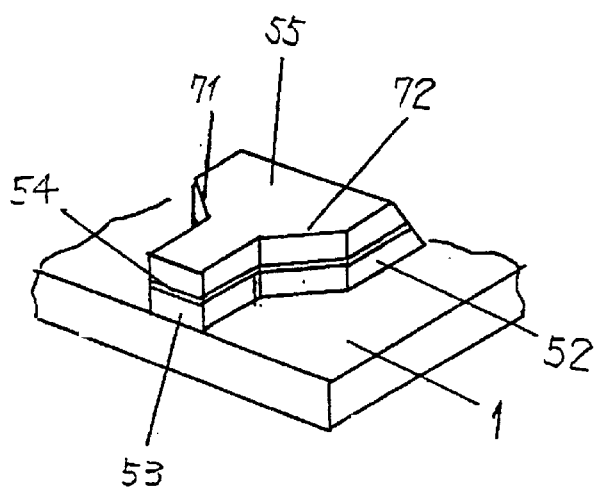
FIG. 7 is a perspective view used to describe a modification of the thin film magnetic head.

FIG. 5 through FIG. 7 illustrate structure of a shared shield section, a lower write chip section, a gap section and an upper write chip section of a thin film magnetic head in accordance with a second exemplary embodiment of the present invention. FIG. 5 is a perspective view showing an outline shape of the lower write chip section and the upper write chip section, among others. FIG. 6 is a cross sectional view showing essential portion of the structure shown in FIG. 5. FIG. 7 shows another exemplary shape of the upper write chip section.

In FIG. 6, a film of lower write chip section 53 is formed in front of a front insulating layer 52 with the end faces making contact to each other, a layer of gap section 54 is stacked over these layers, and then on top of it an upper write chip section 55 is stacked, in the same way as in embodiment 1. The stacked layers are dry-etched for forming the upper write chip section 55 into a protruding shape, as shown in the perspective view of FIG. 5; with a certain specific head track width 56 formed at a tip end, while the hind portion having a width 57 that is greater than the head track width 56. The rest of the structure remains the same as in embodiment 1.

In this configuration, a greater contact area may be secured between the upper write chip section and the yoke section even if the head track width is made smaller. Thus, strong magnetic fields are available, like in embodiment 1.

Figure 8A:
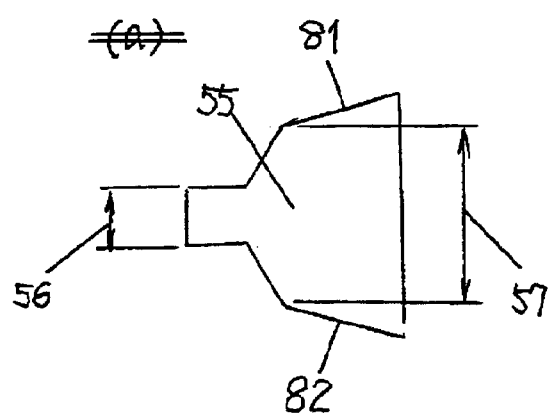
FIG. 8A and FIG. 8B are plan views used to describe other modifications of the thin film magnetic head.
Figure 8B:
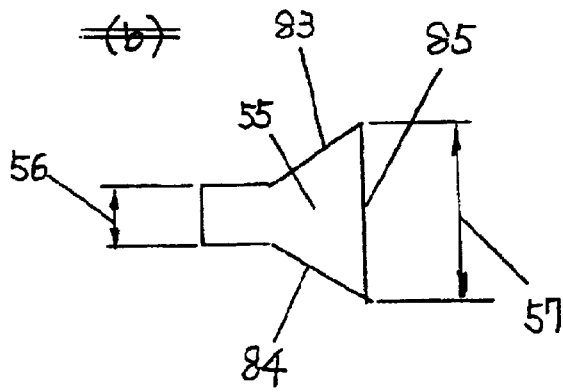

As shown in FIG. 7, the portion stretching from the head track width 56 to the hind width 57 may be formed with surfaces 71, 72 disposed oblique. The side surfaces in the hind portion after the width 57 are not required to be parallel to each other; these surfaces may be disposed instead opening wider towards the rear direction, like the side surfaces 81, 82 shown in FIG. 8A. Or, the hind area after the head track width 56 may be formed, as shown in FIG. 8B, into a simple shape expanding towards the rear direction, which is formed with surfaces 83, 84 and 85.

(Embodiment 3)

Figure 9:
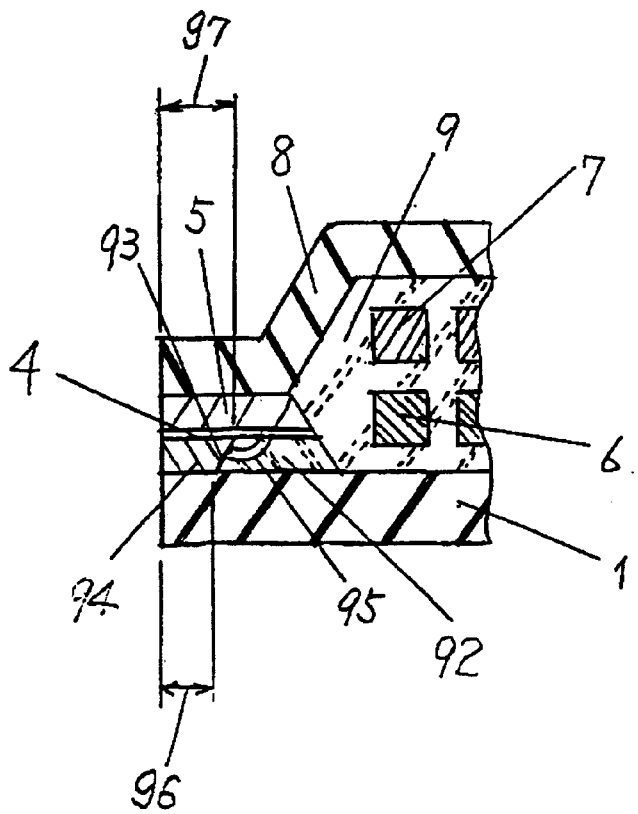
FIG. 9 is a cross sectional view showing the tip end portion of a thin film magnetic head in a third embodiment of the present invention.

FIG. 9 is a cross sectional view at the tip end portion of a thin film magnetic head in a third exemplary embodiment of the present invention. As shown in FIG. 9, a front insulating layer 92 is formed on the shared shield section 1, and then etched off at both ends using a dry-etching or the like process so that the etched surfaces 93 are oblique relative to the shared shield section 1, and a lower write chip section 94 is formed in front of the oblique surface 93 making contact to each other. The gap section 4 is formed on these layers, and the upper write chip section 5 is stacked on it. The yoke section 8, the coils 6, 7 and the insulating body 9 are formed into the same structure with the same material as in embodiment 1. As shown in FIG. 9, length 96 of the surface of the Lower write chip section 94 making contact with the shared shield section 1 is shorter than length 97, which is having contact with the gap section 4, and the end face of lower write chip section 94 making contact with the oblique surface 93 is reverse-tapered.

In the above-described configuration, the leakage magnetic flux 95 onto the oblique surface 93 of the lower write chip section 94 from the upper write chip section 5 is less as compared to a case where the contact surface between the lower write chip section 94 and the front insulating layer 92 is upright. This leads to an improved recording efficiency. The same effects as in embodiments 1 and 2 are also yielded in the present embodiment 3.

(Embodiment 4)

Figure 10:
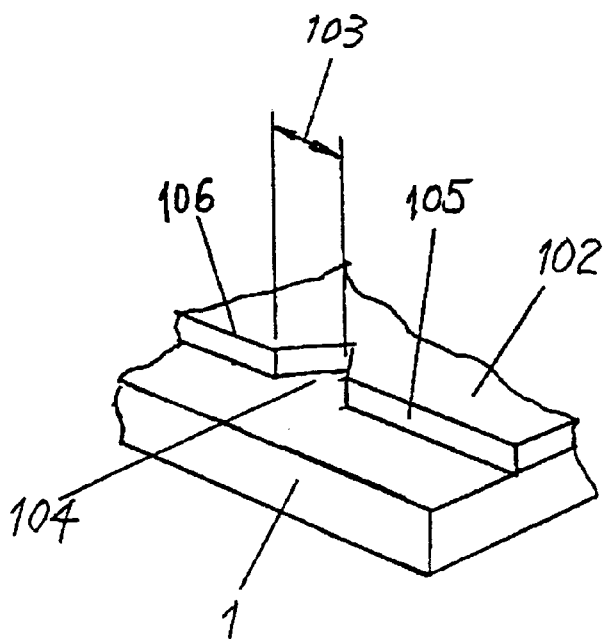
FIG. 10 is a perspective view of a thin film magnetic head in a fourth embodiment, showing the lower insulating layer.
Figure 11:
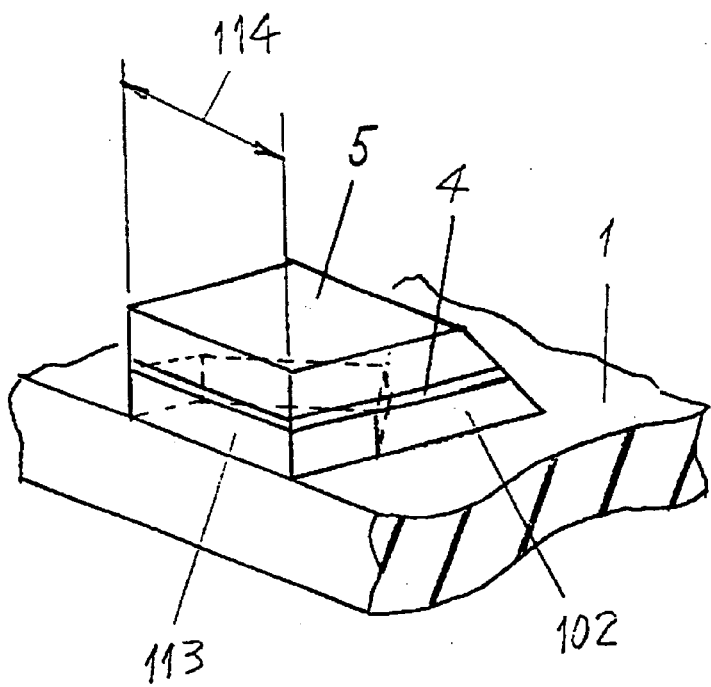
FIG. 11 is a perspective view showing the write chip section of the thin film magnetic head.

FIG. 10 and FIG. 11 show a fourth exemplary embodiment of the present invention. FIG. 10 is a perspective view used to describe a state where the front insulating layer is formed and part of the front portion is etched off by a dry-etching or the like process in preparation for formation of a film for the lower write chip section. First, a front insulating layer 102 is formed on the upper surface of the shared shield section 1. Next, as shown in FIG. 11, front portion of the front insulating layer 102 is etched off by a dry-etching or the like process so that a lower write chip section 113 can be formed therein; furthermore, a surface 105 that is to make contact with a future lower write chip section is provided with an opening 104 whose width is substantially identical to the head track width, and a V-shape cut is formed towards inside, viz. the width of the opening decreasing towards the direction opposite to the area of the future lower write chip section. Then, as shown in FIG. 11, a film for the lower write chip section 113 is formed in the etched area including the V-shape cut, and the upper surface is polished. On top of the polished surface, the gap section 4 and the upper write chip section 5 are stacked, and then these layers are processed altogether for shaping a head track width 114. In this way, the lower write chip section 113 is shaped into a pentagonal form as indicated with dotted lines in the drawing; having parallel sides, the space between them at the tip end portion being substantially identical to the head track width, and other sides at the other portion forming a V-shape of decreasing width.

In the above-described configuration, the magnetic flux between the upper write chip section 5 and the lower write chip section 113 concentrates to the side of the greater width of the lower write chip section 113, or the tip end portion of the opposing write chip sections. Thus the recording magnetic fields are enhanced at the tip end. The narrow width head track can be provided by etching the layers altogether at once at a high precision level. Thus the same effects as the embodiment 1 are also produced in the present embodiment 4.

(Embodiment 5)

Figure 12:
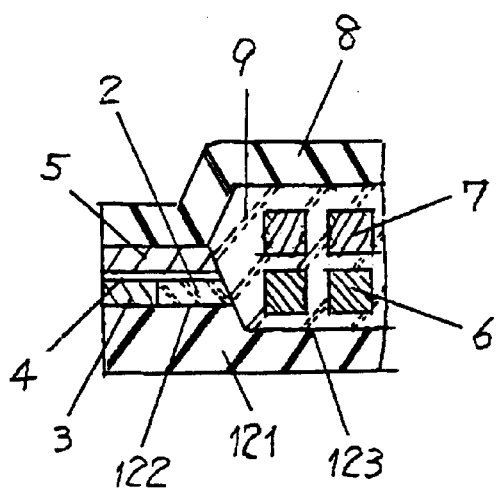
FIG. 12 is a cross sectional view showing the structure of shared shield section of a thin film magnetic head in a fifth embodiment of the present invention.

FIG. 12 is a cross sectional view showing outline structure in the tip end portion of a thin film magnetic head in accordance with a fifth exemplary embodiment of the present invention. A shared shield section 121 is provided with a hollow area on the upper surface, in a manner that an area 123 locating underneath the coils 6, 7 is in a lower level than an area 122 making contact with the bottom surfaces of the front insulating layer 2 and the lower write chip section 3. The gap section 4, the upper write chip section 5, the yoke section 8 and the insulating body 9 are formed in the same manner as in embodiment 1.

In the above-described configuration, inductance of a magnetic channel constituted by a lower magnetic pole formed of the lower write chip section 3 and the shared shield section 121 and the upper magnetic pole formed of the upper write chip section 5 and the yoke section 8 is reduced for the improved high frequency characteristics. The same effects as those of embodiment 1 are of course produced also in the present embodiment 5.

Figure 13:
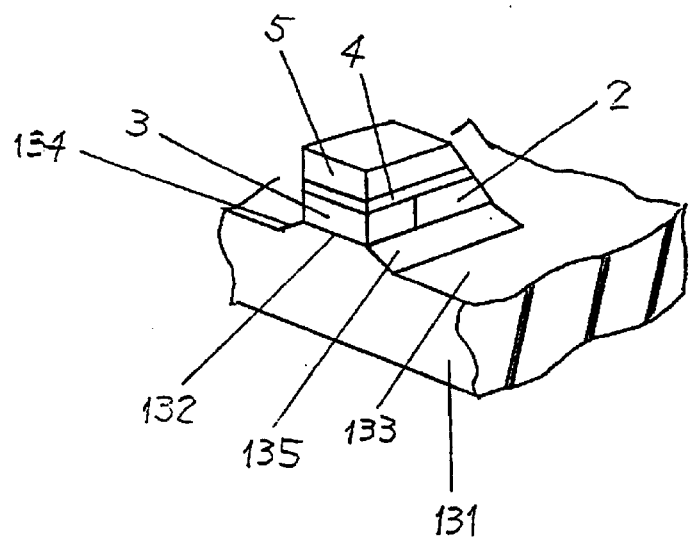
FIG. 13 is a perspective view showing the structure of shared shield section in another example of the thin film magnetic head.

In another example shown in FIG. 13, the upper surface of the shared shield section 131 is provided with a step difference between a platform 132, which is making contact with the bottom surfaces of the front insulating layer 2 and the lower write chip section 3, and an area 133, which is the area outside the bottom surfaces of the insulating layer 2 and the lower write chip section 3; and the upper surface of the platform 132 and the upper surface of the area 133 are connected with an slant surface 134, 135. The gap section 4, the upper write chip section 5, the coil (not shown), the insulating body (not shown) and the yoke section are formed into the same structure and with the same material as in embodiment 1. The slant surface 134, 135, is not required to be a flat surface; it may be formed of a part of cylindrical surface or other surfaces of any other curvature. The above-described configuration also provides the same effects as in embodiment 1.

Figure 48:
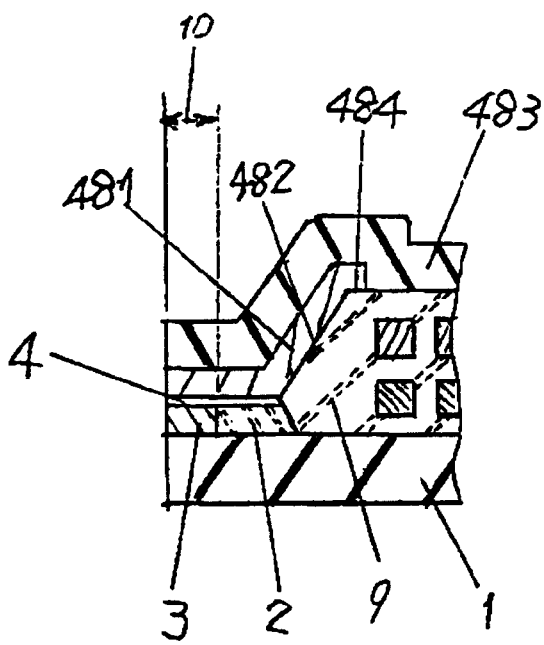
FIG. 48 is a cross sectional view showing an example of modifications of a thin film magnetic head in a fifth embodiment of the present invention.

If, as shown in a cross sectional view of FIG. 48, the upper write chip section 481 is made longer than the head gap depth 10 so as reaching to a slant portion 482 of the insulating body 9 and to a portion 484 of yoke section 483 opposing to the shared shield section 1 in the above-described examples in accordance with the embodiments 1 through 5, the same effects yielded in the embodiments 1 through 5 are of course provided.

(Embodiment 6)

FIG. 14 through FIG. 34 are illustrations used to describe process steps for fabricating a thin film magnetic head, in accordance with a sixth exemplary embodiment of the present invention. Each of the process steps will be described in the order of the procedure with reference to the FIG. 14 through FIG. 34.

Figure 14:
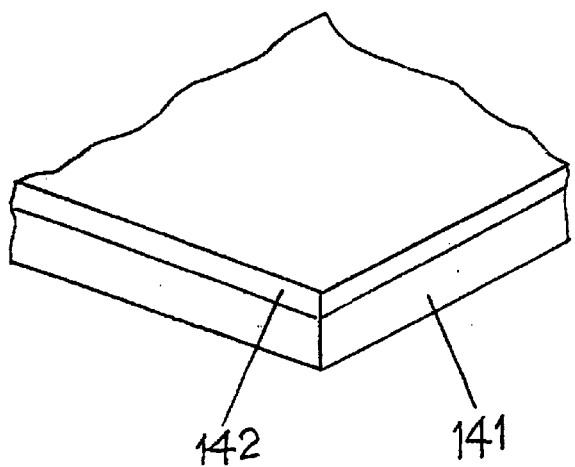
FIG. 14 through FIG. 22 are illustrations used to describe process steps 1 through 9 in a method for fabricating a thin film magnetic head in accordance with a sixth embodiment of the present invention.

The first step is, as shown in FIG. 14, forming an insulating layer 142 of $Al_2O_3$, $SiO_2$ or the like material on the polished upper surface of a shared shield section 141 made of permalloy, a Co system amorphous or the like material, using a sputtering or other film forming processes.

Figure 15:
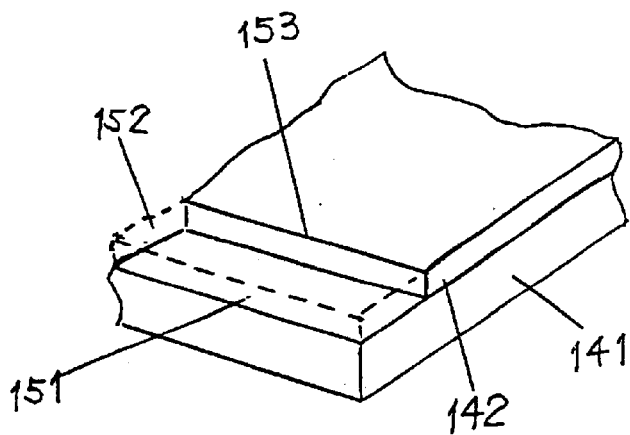

The second step is, as shown in FIG. 15, removing the front portion 151 of the insulating layer 142 formed at the first step on the upper surface of the shared shield section 141, and to have the shared shield section 141 exposed. The removing is made by using a dry-etching or the like process so that the edge line 153 assumes a straight line shape. A portion 152 indicated with dotted lines in FIG. 15 represents the portion that has been etched off in the second step.

Figure 16:
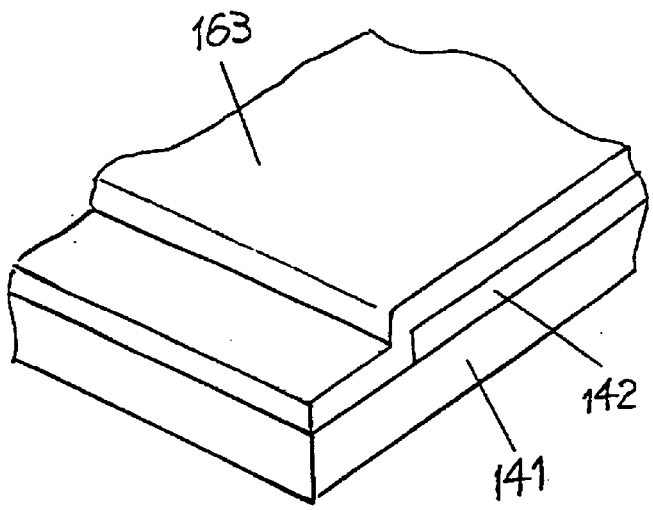

The third step is, as shown in FIG. 16, covering the entire upper surface with a lower high Bs magnetic layer 163 of FeN or the like material up to the same thickness as the insulating layer, using a sputtering or other film forming processes.

Figure 17:
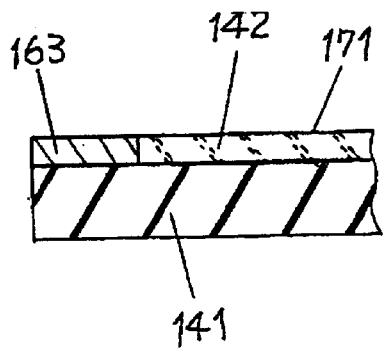

The fourth step is, as shown in FIG. 17, polishing the upper surfaces of the insulating layer 142 and the lower high Bs magnetic layer 163, both formed on the shared shield section 141, using the CMP or the like method, so that the polished surface is in parallel with the upper surface of the shared shield section 141. Thus the upper surface 171 after the polishing is in parallel with the upper surface of the shared shield section 141, and the lower high Bs magnetic layer 163 is disposed serially in front of the insulating layer 142.

Figure 18:
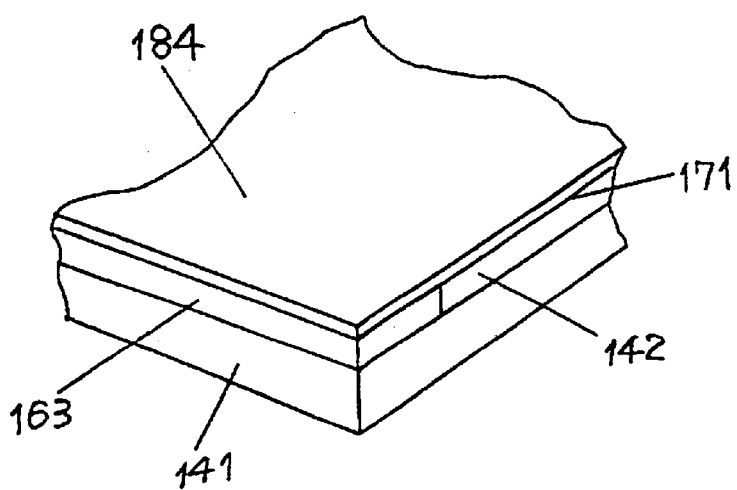

The fifth step is, as shown in FIG. 18, forming a gap layer 184 of $Al_2O_3$, $SiO_2$ or the like material covering the entire upper surface 171, using a sputtering or other film forming processes.

Figure 19:
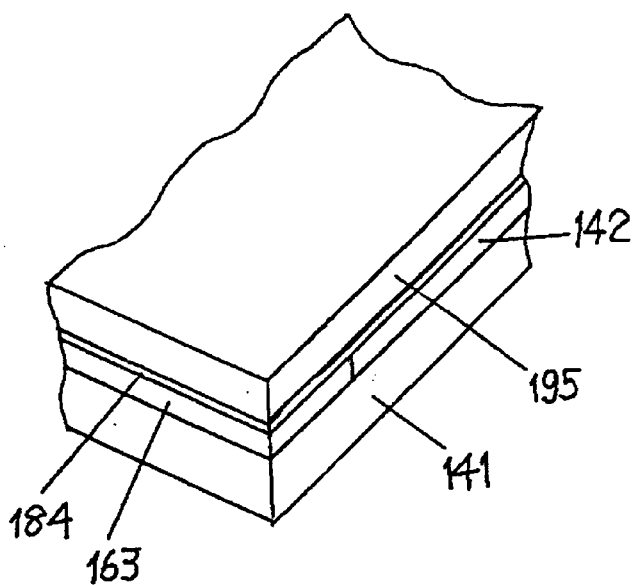

The sixth step is, as shown in FIG. 19, forming an upper high Bs magnetic layer 195 of FeN or the like material, using a sputtering or other film forming processes.

Figure 20:
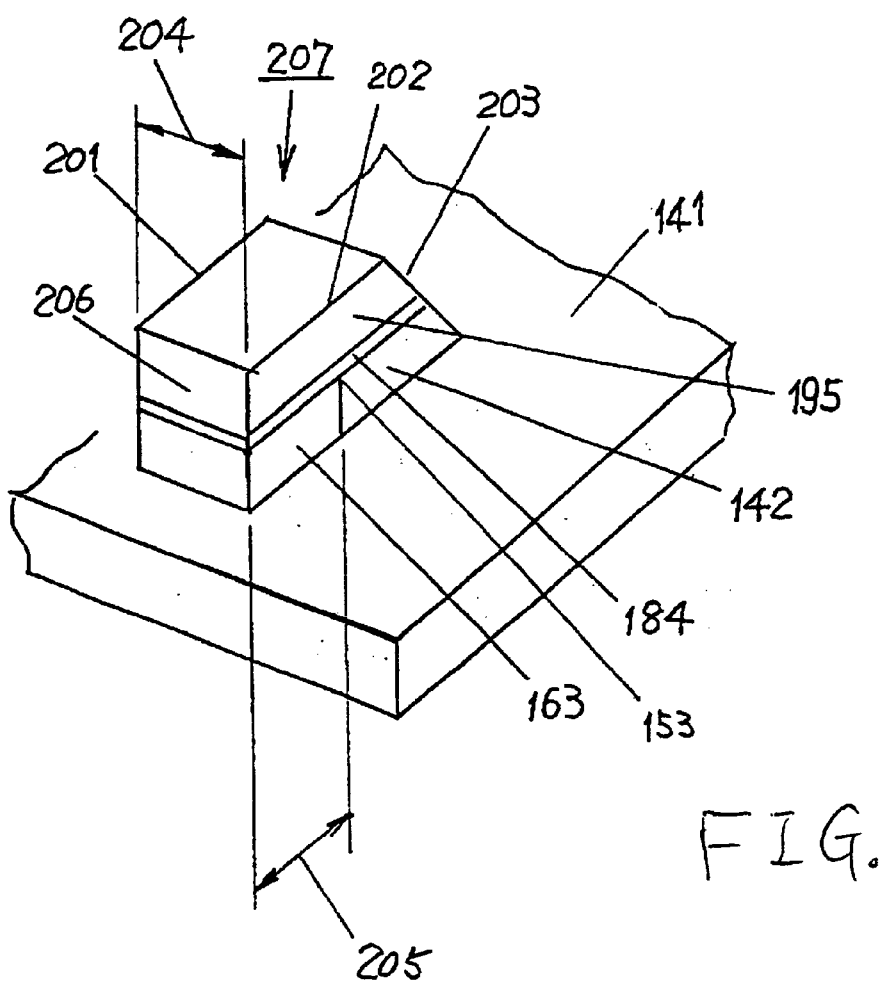

The seventh step is, as shown in FIG. 20, shaping a cubical structure 207 formed of six planes through etching of the upper high Bs magnetic layer 195 and other layers stacked on the shared shield section 141, using a dry-etching or the like process. The six planes forming the cubical structure 207 are: the right and the left side surfaces 201, 202, which are on the two planes approximately perpendicular to the edge line representing edge of the insulating layer etched at the second process step, or the edge line 153 (not visible in FIG. 20) at which the upper surfaces of the lower high Bs magnetic layer 163 and the insulating layer 142 are making contact to each other, and space between the two planes is identical to a certain specific head track width 204; a front surface 206 locating in the same side as the lower high Bs magnetic layer 163 in relation to the edge line 153, and on a plane that is substantially perpendicular to the left and the right side surfaces 201, 202 and to the upper surface of the shared shield section 141; a rear surface 203 locating in the same side as the insulating layer 142 in relation to the edge line 153, and on a plane whose crossing line formed with a plane parallel to the upper surface of the shared shield section 141 is substantially in parallel with the front surface 206; a bottom surface of the lower high Bs magnetic layer 163 and the insulating layer 142 disposed serially; and an upper surface of the upper high Bs magnetic layer 195. The surrounding area outside the bottom surfaces of the lower high Bs magnetic layer 163 and the insulating layer 142 serially disposed to each other, both layers being a constituent part of the cubical structure 207, is ground off by a smallest etching quantity using a dry-etching or the like process so that the shared shield section 141 is exposed to form a substantially same plane as the shared shield section 141 processed at the first step. The distance at the gap layer 184 between the left side surface 201 and the right side surface 202 represents the head track width 204. The head track width 204 in FIG. 20 is implemented by etching the upper high Bs magnetic layer 195, the gap layer 184, the lower high Bs magnetic layer 163 and the insulating layer 142 of FIG. 19 altogether. Referring to FIG. 20, location of the front surface 206 is determined so that distance 205 between the edge line 153 and the front surface 206 is greater than a certain specific head gap depth. Each of the upper high Bs magnetic layer 195, the gap layer 184, the lower high Bs magnetic layer 163 and the insulating layer 142 constituting the cubical structure 207 corresponds respectively to the upper write chip section, the gap section, the lower write chip section and the front insulating layer of embodiment 1.

Figure 21:
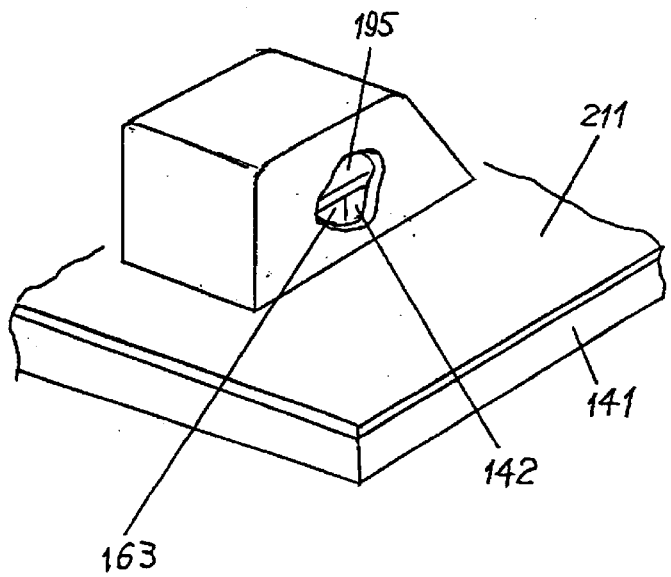

The eighth step is, as shown in FIG. 21, which being a partially broken view, forming an insulating underlayer 211 of $Al_2O_3$, $SiO_2$ or the like material to cover the exposed upper surface of the shared shield section 141, as well as the upper surface, the left and the right side surfaces, the front surface and the rear surface of the cubical structure 207, using a sputtering or the like process.

Figure 22:
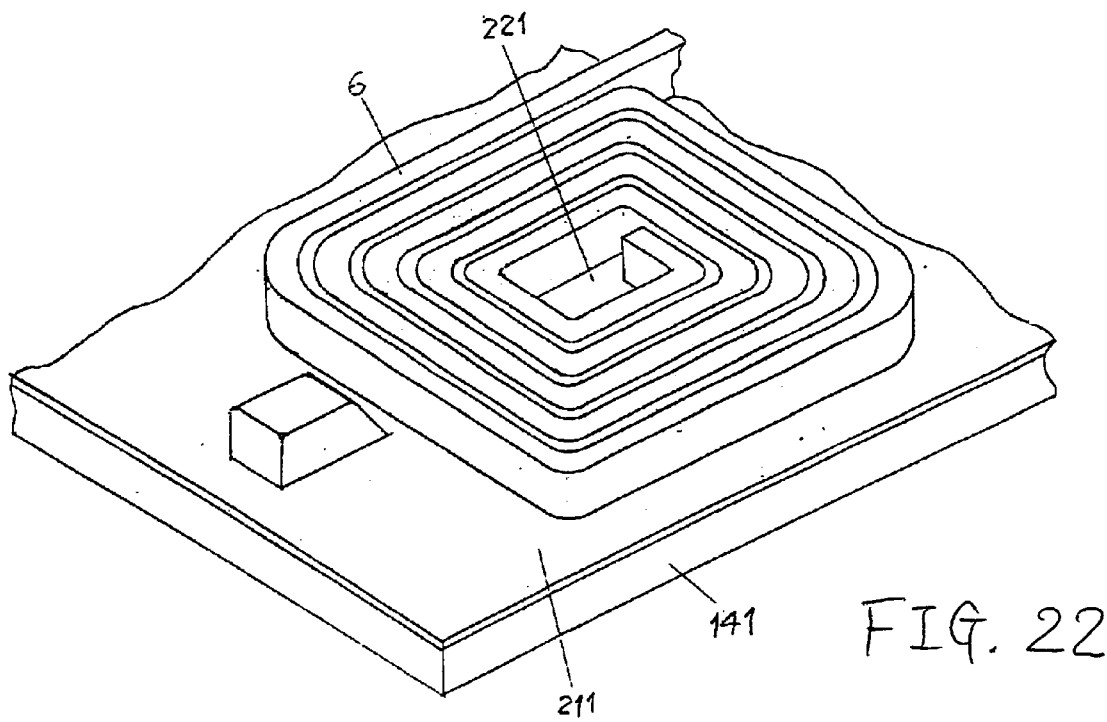

The ninth step is, as shown in the perspective view FIG. 22, is forming a first layer coil 6 by plating of a metal on the insulating underlayer 211 formed at the eighth step, in a place behind the cubical structure 207 so that the height is approximately on the same level as the upper surface of the insulating underlayer 211 on the cubical structure 207. Central area 221 of the first layer coil 6 should be large enough to provide a yoke section, which will be referred to later.

Figure 23:
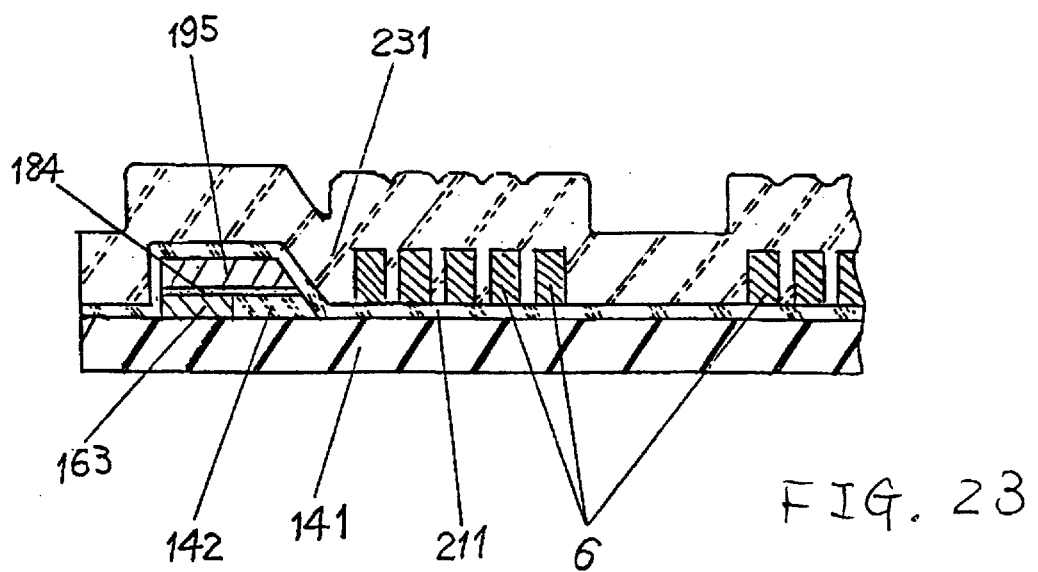
FIG. 23 and FIG. 24 are illustrations used to describe the tenth process step in the fabricating method.
Figure 24:
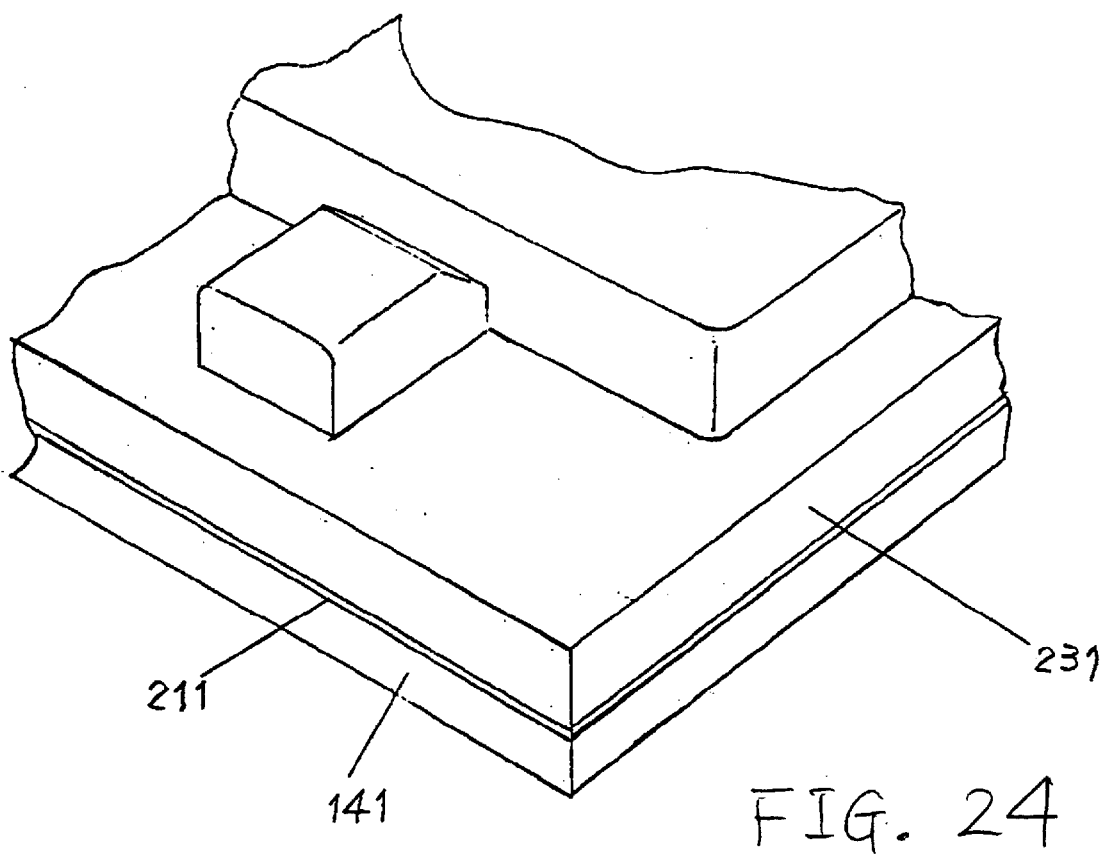

The tenth step is, as shown in FIG. 23 (cross sectional view) and FIG. 24 (perspective view), forming a lower insulating layer 231 of $Al_2O_3$, $SiO_2$ or the like material covering completely the first layer coil 6, using a sputtering or the like process.

Figure 25:
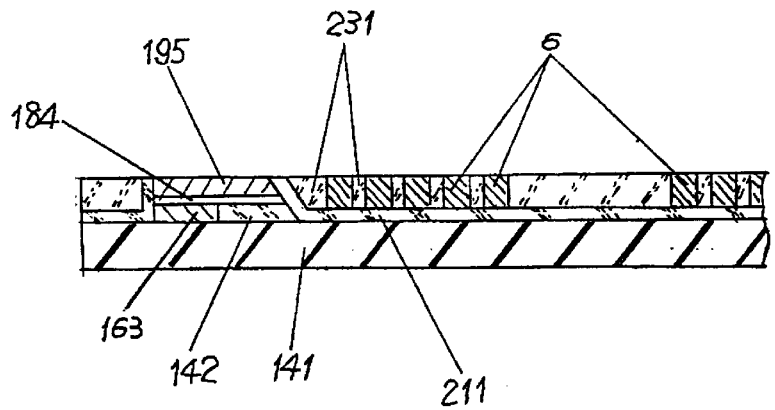
FIG. 25 and FIG. 26 are illustrations used to describe respectively the eleventh and the twelfth steps in the fabricating method.

The eleventh step is, as shown in FIG. 25, polishing the upper surface covered with the insulating underlayer 231 to a flat plane that is in parallel with the upper surface of the shared shield section 141, using the CMP or other processes so that the upper high Bs magnetic layer 195 and the first layer coil 6 are exposed.

Figure 26:
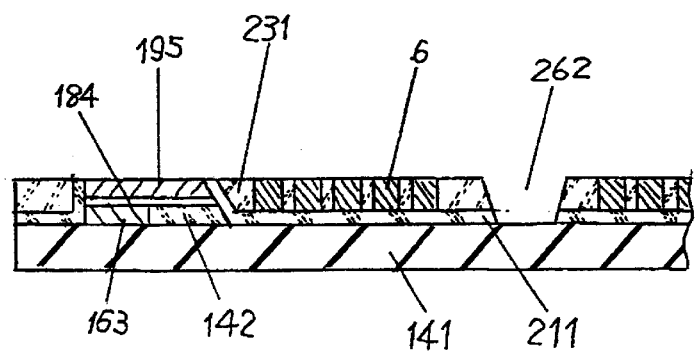

The twelfth step is, as shown in FIG. 26, removing at the central area of the first layer coil 6 the insulating underlayer 211 and the lower insulating layer 231 formed in an earlier process step, so that the shared shield section 141 is exposed, using a dry-etching process. The space 262 provided at the present step is for accepting the future formation of the yoke section, which makes contact with the shared shield section here.

Figure 27:
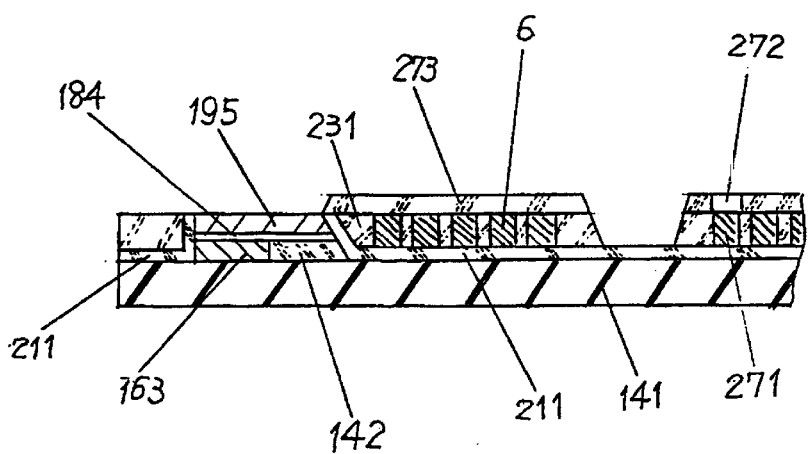
FIG. 27 and FIG. 28 are illustrations used to describe the thirteenth step in the fabricating method.
Figure 28:
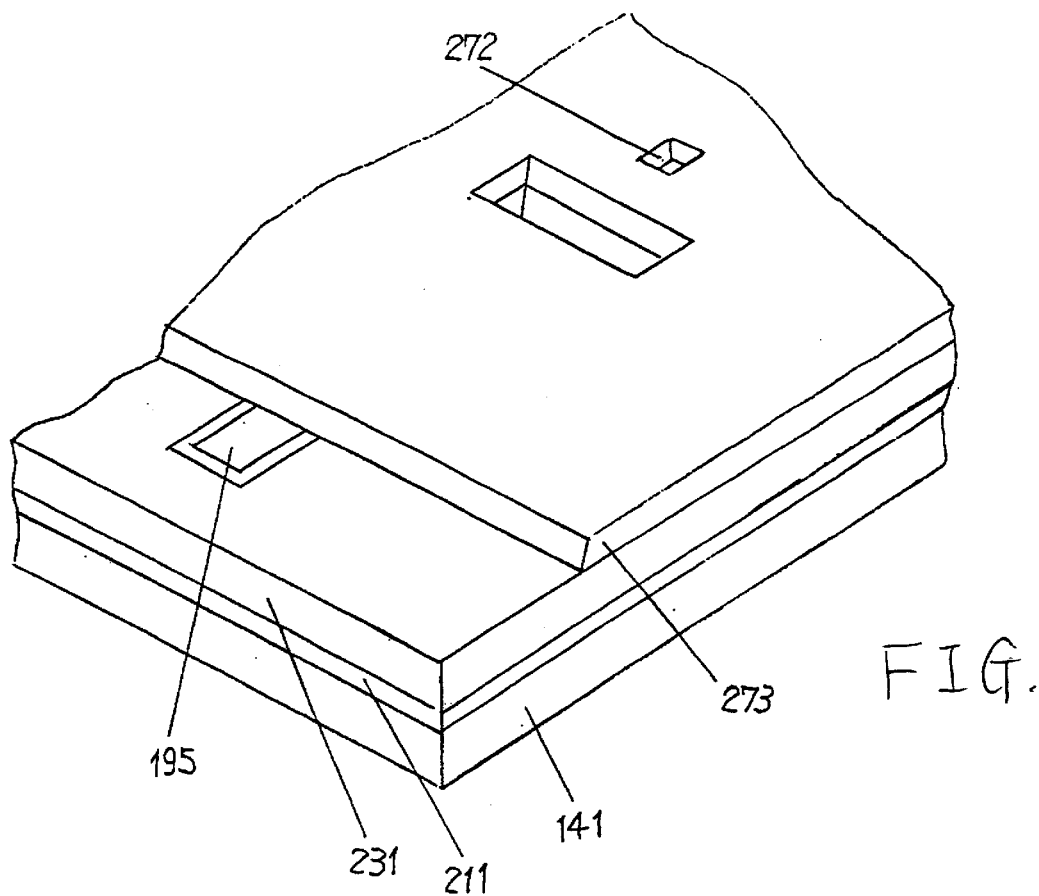

The thirteenth step is, as shown in FIG. 27 (cross sectional view) and FIG. 28 (perspective view), forming an intermediary insulating layer 273 of $Al_2O_3$, $SiO_2$ or the like material using a photoresist so that the exposed upper surface of the upper high Bs magnetic layer 195 polished at the eleventh step and the upper surface of the shared shield section 141 exposed at the previous process step are maintained in the exposed state as they are, while a through hole 272 is provided on the innermost winding 271 of the first layer coil 6. The through hole 272 may either be round, square, or any other form; however, what is essential is that the through hole should not encompass two windings.

Figure 29:
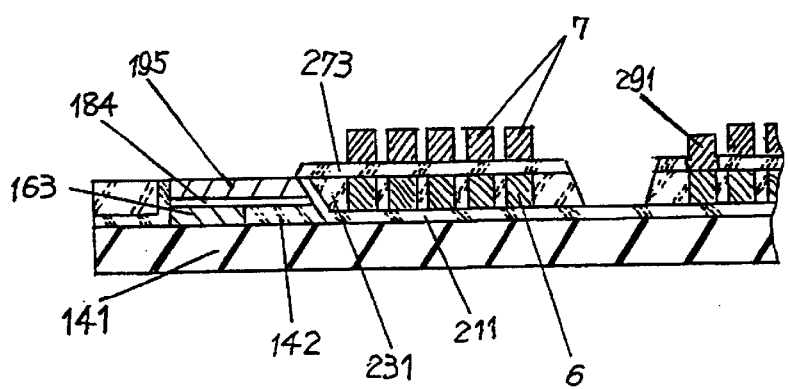
FIG. 29 and FIG. 30 are illustrations used to describe the fourteenth step in the fabricating method.
Figure 30:
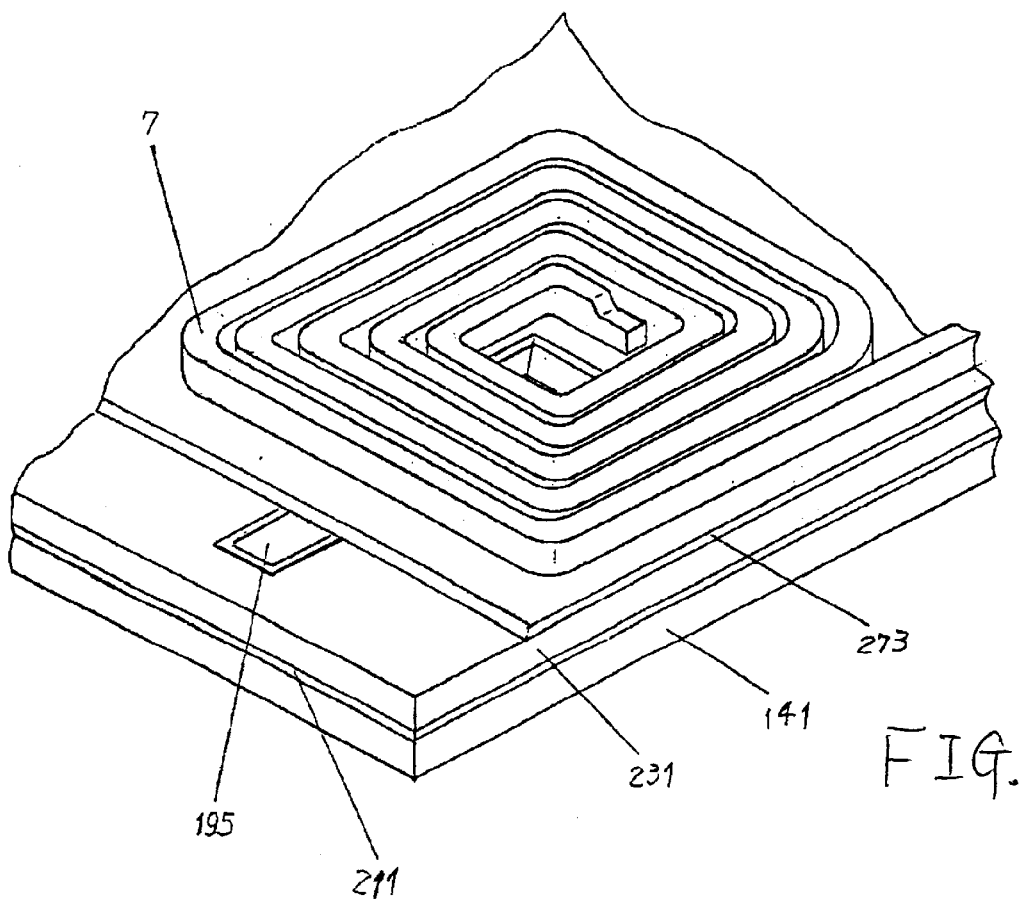

The fourteenth step is, as shown in FIG. 29 (cross sectional view) and FIG. 30 (perspective view), forming a second layer coil 7 by plating of a metal on the upper surface of the intermediary insulating layer 273 so that the innermost winding 291 locates on the through hole 272 provided in the intermediary insulating layer 273.

Figure 31:
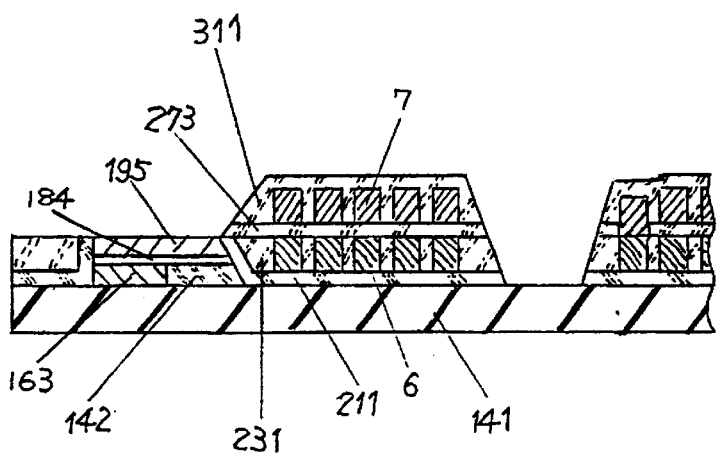
FIG. 31 and FIG. 32 are illustrations used to describe respectively the fifteenth and the sixteenth steps in the fabricating method.

The fifteenth step is, as shown in FIG. 31, forming an upper insulating layer 311 of $Al_2O_3$, $SiO_2$ or the like material using a photoresist so that the exposed upper surface of the upper high Bs magnetic layer 195 and the exposed upper surface of the shared shield section 141 exposed at the eleventh step and the twelfth step respectively are maintained exposed as they are, while the second layer coil 7 is covered completely.

Figure 32:
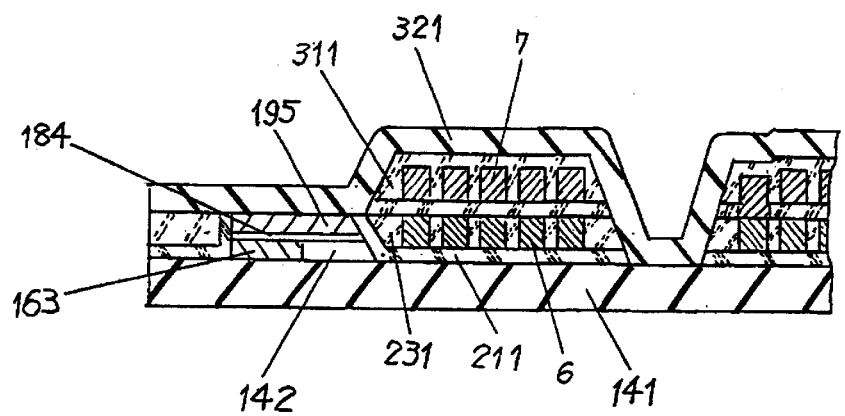

The sixteenth step is, as shown in FIG. 32, providing a high ρ magnetic layer 321 of FeMgO or the like material to cover the exposed upper high Bs magnetic layer 195, the upper insulating layer 311 formed at the previous process step and the exposed upper surface of the shared shield section 141, using a sputtering or other film forming processes. The high ρ magnetic layer 321 thus formed makes contact with the upper surface of the upper high Bs magnetic layer 195 exposed at the eleventh process step, while in the rear part it makes contact with the upper surface of the shared shield section 141 exposed at the twelfth process step.

Figure 33:
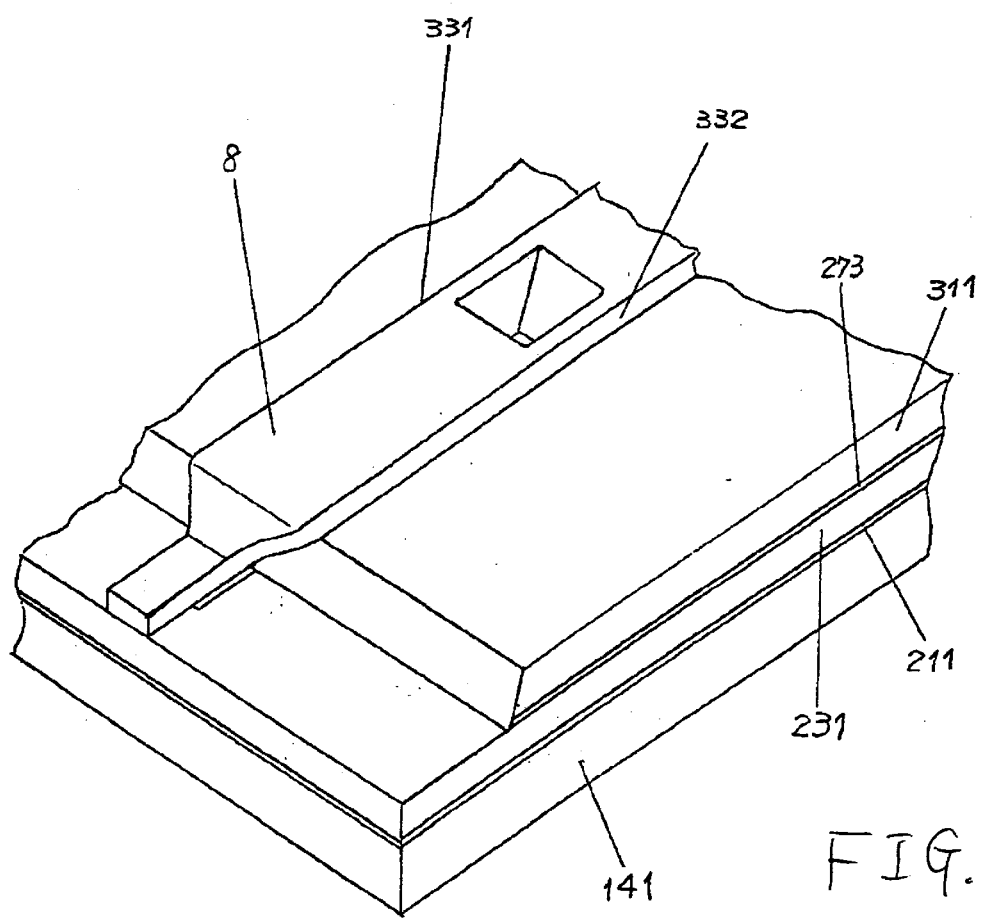
FIG. 33 is an illustration used to describe the seventeenth step in the fabricating method.

The seventeenth step is, as shown in FIG. 33, forming a yoke section 8 by partially removing the high ρ magnetic layer 321 with a dry-etching or the like process so that the width is substantially identical to width of the upper high Bs magnetic layer 195 at the region making contact with the upper high Bs magnetic layer 195, while in the hind region the width is greater than width of the upper high Bs magnetic layer 195. Although in FIG. 33 the hind region of the yoke section 8 is regulated by two side surfaces 331 and 332 that are approximately parallel to each other, it is not essential that the side surfaces are in the parallel state.

The thin film magnetic heads provided on a wafer through the above-described process steps, are separated into bar pieces. Front end of the bar is polished to a flat plane so that the flat plane is in parallel with the edge line 153, perpendicular to both side surfaces 201, 202 of the cubical structure and the upper surface of the shared shield section 141; at the same time, the distance from the edge line 153 meeting a certain specific head gap depth.

The bar thus polished is then split into individual thin film magnetic heads, each of which undergoes a finishing process to become a finished thin film magnetic head.

Figure 34:
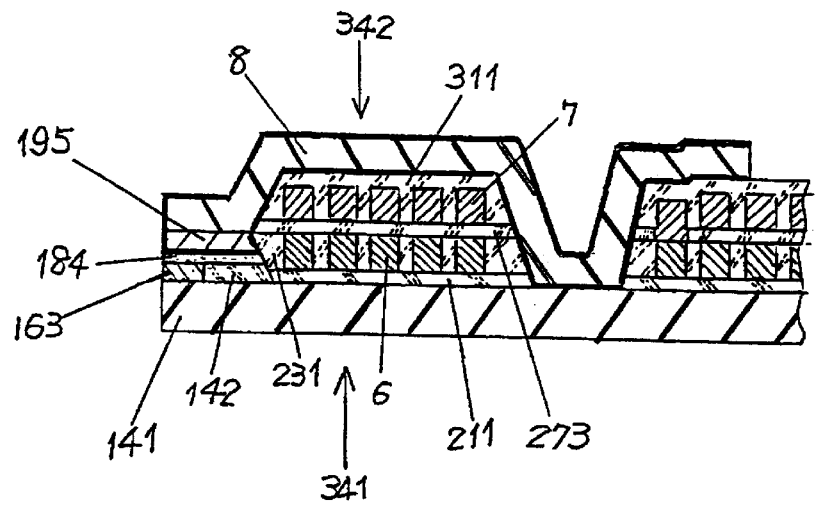
FIG. 34 is a cross sectional view of a thin film magnetic head formed through the process steps up to the seventeenth step in the fabricating method.

Cross sectional view of a thin film magnetic head fabricated through the above-described process steps is shown in FIG. 34. The thin film magnetic head comprises constituent portions of the cubical structure formed at the seventh process step, namely, a lower magnetic pole 341 formed of a lower high Bs magnetic layer 163 and a shared shield section 141; an insulating layer 142 disposed serially to the lower high Bs magnetic layer 163; a gap layer 184; an upper magnetic pole 342 (portion surrounded with bold lines) formed of an upper high Bs magnetic layer 195 and a yoke section 8; a first layer coil 6 and a second layer coil 7 both winding around the yoke section 8 in the rear portion at a neighborhood of the place where it is making contact with the shared shield section 141; and an insulating body consisting of an insulating underlayer 211, a lower insulating layer 231, an intermediary insulating layer 273 and an upper insulating layer 311 provided in a space formed by the yoke section 8 and the shared shield section 141 disposed in parallel and opposed to each other.

In the present embodiment 6, where the insulating layer 142 disposed serially to the lower high Bs magnetic layer 163, the gap layer 184 and the upper high Bs magnetic layer 195 are processed altogether at once in the seventh process step, a narrow width head track, which is an essential element for implementing the high recording density, is realized at a very high accuracy level. Furthermore, since the length of the upper high Bs magnetic layer 195 in the direction of depth is always greater than depth of the lower high Bs magnetic layer 163, or the head gap depth, a thin film magnetic head in accordance with the present embodiment provides high efficiency and strong magnetic fields that meet a high Hc recording medium. Furthermore, since the yoke section constituting the upper magnetic pole is made of a high ρ magnetic layer, it provides improved high frequency characteristics, which being an essential factor for increasing the recording density.

Figure 35:
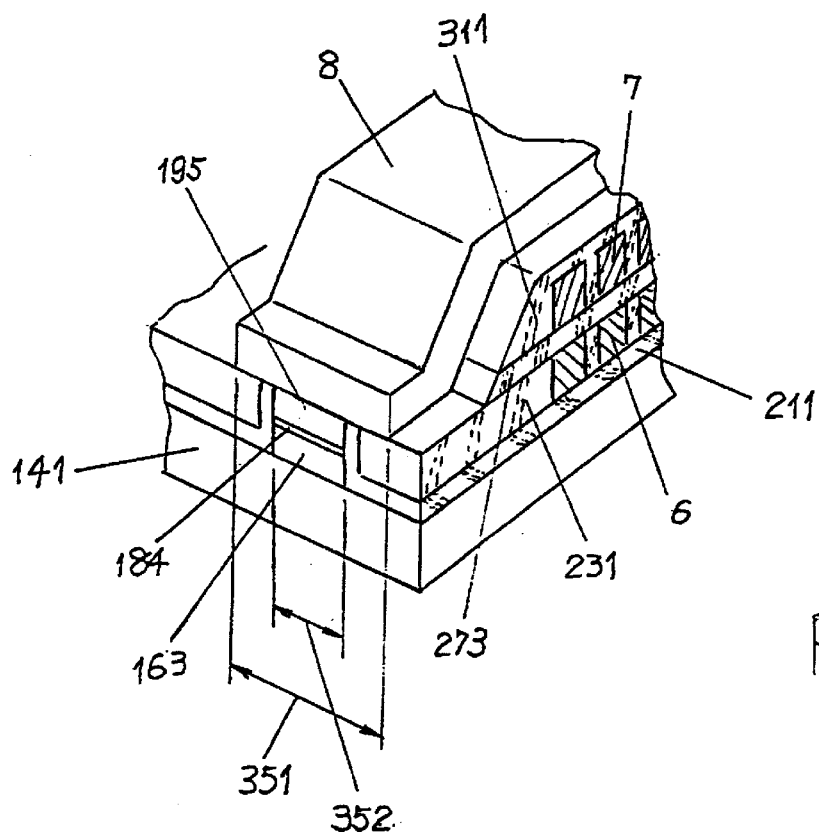
FIG. 35 through FIG. 37 are illustrations used to describe various modifications of the seventeenth process step in the fabricating method.

If, in the seventeenth process step, the width 351 of yoke section 8 (ref. FIG. 35) is made to be greater than the head track width, viz. the width 352 of the upper high Bs magnetic layer 195 and the lower high Bs magnetic layer 163 opposing to each other with the gap layer 184 interposed, a region of contact between yoke section 8 and upper high Bs magnetic layer 195 becomes greater. As the result, ample amount of magnetic flux is supplied from the yoke section 8 for generating stronger magnetic fields. Thus, a high recording efficiency thin film magnetic head is provided.

Figure 36:
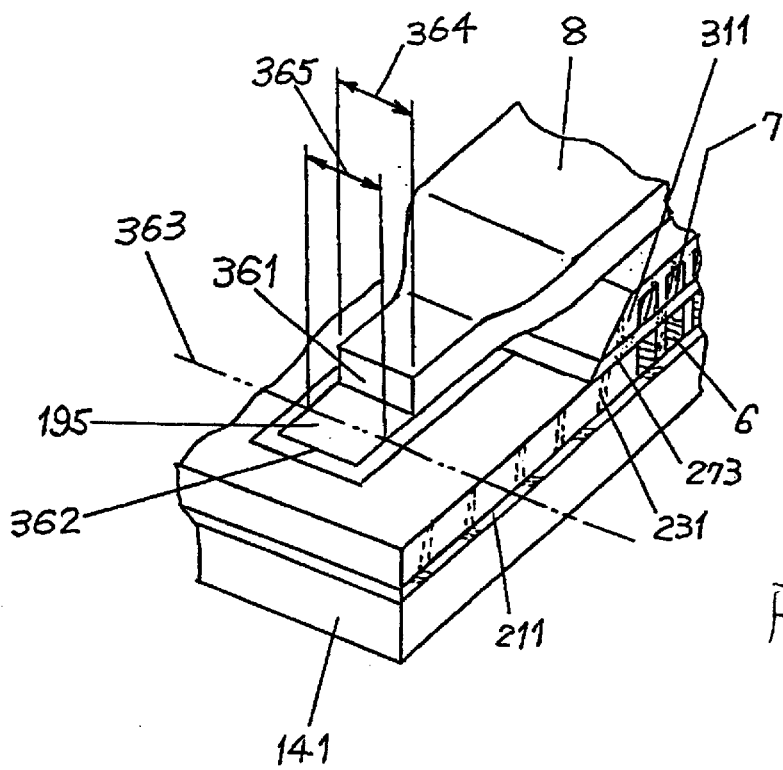

Referring to FIG. 36 (the right side is shown sectioned), if, in the seventeenth process step, the tip end face 361 of yoke section is made to locate at a place between the front face of the lower high Bs magnetic layer (not shown), which front face being on the same plane as the front face 362 of the upper high Bs magnetic layer 195, and the contact plane making contact with the insulating layer (not shown) disposed serially in the rear, at the same time the place locating behind a plane 363 formed as a result of the polishing process applied to the bar separated out of a wafer for providing a certain specific head gap depth, and the yoke section 8 is shaped by dry-etching the width 364 to be substantially the same width 365 of the upper high Bs magnetic layer 195, then the fringe can be reduced and the side erase width is reduced. Thus, a thin film magnetic head having an effect of narrowed record track pitch is provided.

Figure 37:
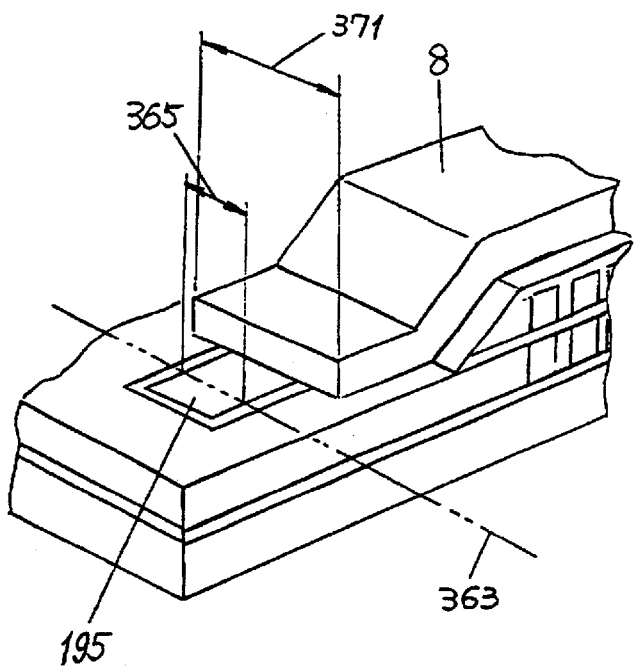

Width 371 of the yoke section 8 may be made greater than the width 365 of the upper high Bs magnetic layer 195 as shown in FIG. 37 (right side is shown sectioned). The above-configured yoke 8 brings about an expanded region of contact with the upper high Bs magnetic layer 195. This provides a greater contact region despite a reduced head track width and reduces the fringe. Thus, a thin film magnetic head having a high recording efficiency and capable of increasing the recording density with a narrow track pitch is provided.

(Embodiment 7)

Figure 38:
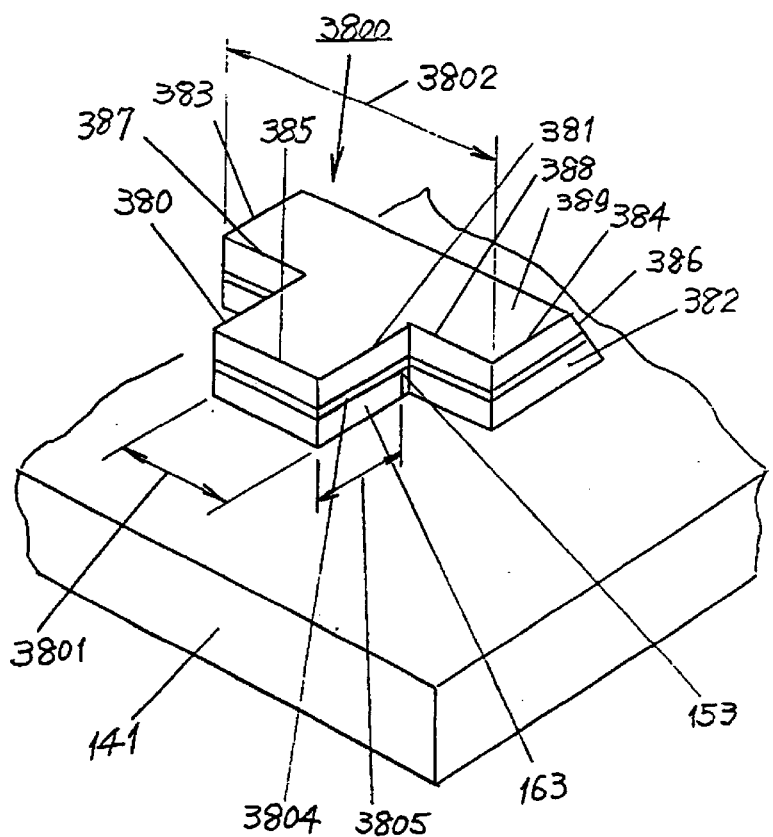
FIG. 38 is a perspective view of a thin film magnetic head in a seventh embodiment of the present invention.

FIG. 38 is a perspective view showing a seventh exemplary embodiment of the present invention. In the present embodiment 7, a cubical structure 3800 formed of the following ten facets is provided at the seventh process step of the embodiment 6. The ten facets are: a first left surface 380 and a first right surface 381, the surfaces are respectively on two planes which are substantially perpendicular to an edge line 153 (not seen in the drawing) formed by the upper surface of a lower high Bs magnetic layer 163 and the upper surface of an insulating layer 382 serially disposed, space between the two surfaces representing a certain specific head track width 3801; a second left surface 383 and a second right surface 384, width 3802 of the space between the two surfaces being greater than the head track width 3801, or the space between the first left surface 380 and the first right surface 381; a front surface 385 locating in the same side as the lower high Bs magnetic layer 163 relative to the edge line 153 with the distance from it to be greater than a certain specific head gap depth, which front surface being on a plane substantially perpendicular to the first left and right surfaces 380, 381 and to the upper surface of the shared shield section 141; a rear surface 386 locating in the same side as the insulating layer 382 relative to the edge line 153, which rear surface being on a plane whose crossing line with a horizontal plane running in parallel to the upper surface of the shared shield section 141 is substantially parallel to the front surface 385; a left intermediary surface 387 and a right intermediary surface 388 connecting respectively the first left and right surfaces 380, 381 and the second left and right surfaces 383, 384; a lower surface of the lower high Bs magnetic layer 163 and the insulating layer 382; and an upper surface of the upper high Bs magnetic layer 389.

The cross sectional shape of which cubical structure 3800, sectioned by a plane that is in parallel with the upper surface of the shared shield section 141, assumes a protruding shape. An area surrounding the bottom regions of the lower high Bs magnetic layer 163 and the insulating layer 382 is etched by a dry-etching or the like process for a smallest etching quantity so that it is substantially on the same plane as the upper surface of the shared shield section at the first process step and the shared shield section 141 is exposed. Thus, a distance between the first left surface 380 and right surface 381 represents the head track width. The upper high Bs magnetic layer 389, the gap layer 3804, the lower high Bs magnetic layer 163 and the insulating layer 382 are processed altogether at once to form a head track width 3801. Location of the front surface 385 is determined so that the distance 3805 between the edge line 153 and the front surface 385 is longer than a certain specific head gap depth.

As described in the above, a thin film magnetic head in the present embodiment 7 is fabricated by replacing the seventh step of embodiment 6 with the above-described process, while the other process steps of embodiment are kept as they are.

In the present embodiment 7, since the head track width is formed by processing the layers altogether at once, the head track width can be implemented at a high precision level even if it is narrow. This enables to raise the surface recording density. Furthermore, the increased area of contact between the upper high Bs magnetic layer and the yoke section assures an efficient supply of sufficient magnetic flux from the yoke section. So, strong magnetic fields are available. Furthermore, even if the head track width is narrowed, the upper high Bs magnetic layer can be made longer without making the head gap depth longer, and a great contact area can be provided.

Other examples that can replace the seventh process step of embodiment 6 are described below.

Figure 39:
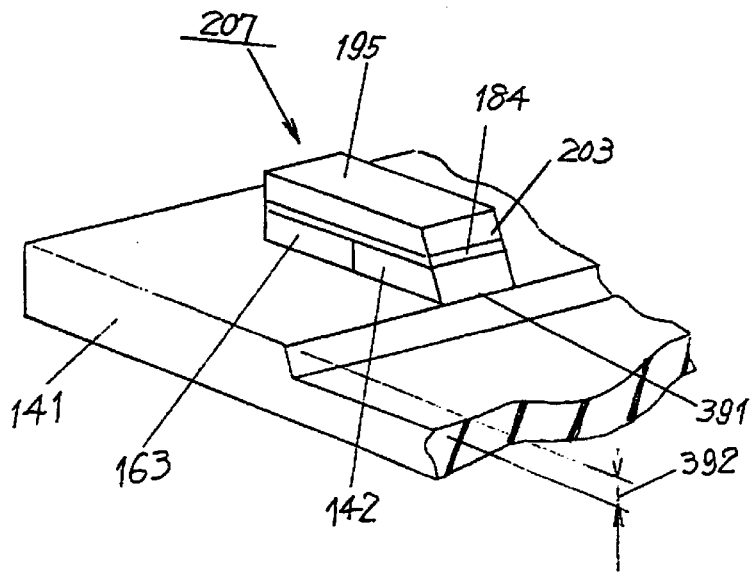
FIG. 39 through FIG. 44 are perspective views showing various modifications of the thin film magnetic head.

FIG. 39 is a perspective view of one of the examples seen from the behind. At the same time when a cubical structure 207 is formed, a first step difference 392 and a second surface are provided by a dry-etching process. Namely, a lowered second surface is formed in a manner that the shared shield section 141 is on a level that is lower than the upper surface (first plane) of the shared shield section 141 making contact with the lower high Bs magnetic layer 163 in a region behind a crossing line 391 formed by the rear surface 203 of the cubical structure 207 and the upper surface of the shared shield section 141. A first step difference 392 is formed in the border between the first surface and the second surface. A certain specific head track width is thus shaped by processing the layers altogether at once. The same effects as those in embodiment 6 are provided when the seventh step of embodiment 6 is replaced with the above-described process, while keeping the rest of the processes as they are. Thus a thin film magnetic head having improved high frequency characteristics at a reduced inductance of the magnetic pole is provided.

Figure 40:
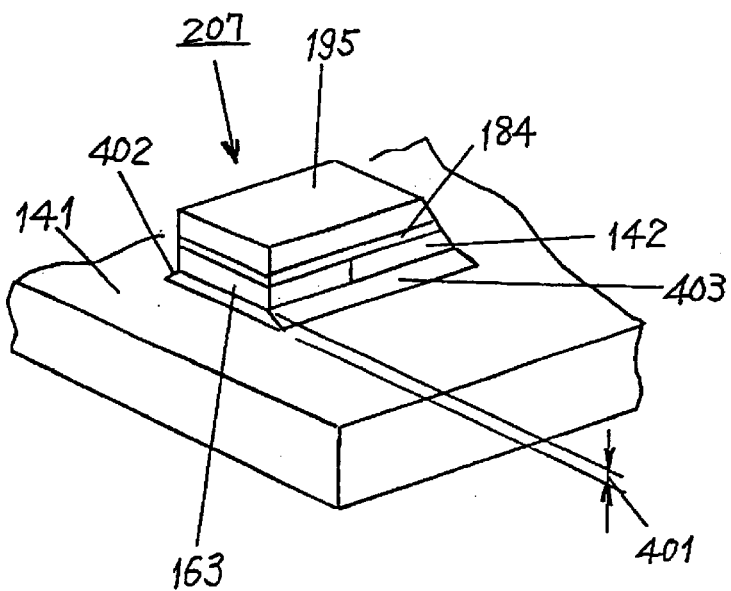

Still other example is shown in FIG. 40, which is a perspective view seen from the front right. In the example, a second step difference 401 and a slant surface 402, 403 are formed by a dry-etching process. Namely, a second step difference 401 is provided between the first plane, which is the upper surface of the shared shield section 141 making contact with the bottom surfaces of the lower high Bs magnetic layer 163 and the insulating layer 142, which being constituting part of the cubical structure 207, and a third plane, which is the upper surface of said shared shield section in an area locating at the front, left and right outside of the bottom regions of the lower high Bs magnetic layer 163 and the insulating layer 142, which being constituting part of the cubical structure 207. The first plane is locating in a level higher than the third plane, and the surfaces on the different two planes are connected by a slant surface 402, 403. In this way, a certain specific head track width is provided by processing the layers altogether at once with a dry-etching process. A thin film magnetic head having the same effects as those of embodiment 6 is provided in the present embodiment 7 when the seventh step of embodiment 6 is replaced with the above-described process, while keeping the rest of the processes as they are. The surfaces 402, 403 connecting the first surface and the third surface do not need to be flat; instead, they may be formed of part of a cylindrical surface, or other curved surfaces.

Still more variations are available as the replacement for the seventh step of embodiment 6. The six-facet cubical structure 207 shown in FIG. 20 and the ten-facet cubical structure 3800 shown in FIG. 38 may be combined respectively with the shared shield section shaped to have a second surface that is lowered with a first step difference shown in FIG. 39 and the shared shield section shaped to have a third surface that is lowered with a second step difference shown in FIG. 40. The seventh step of embodiment 6 may be replaced with one of the combinations of the cubical structures and the shared shield sections as illustrated in FIG. 41 through FIG. 44. Examples of the replacement for the seventh step are described next.

Figure 41:
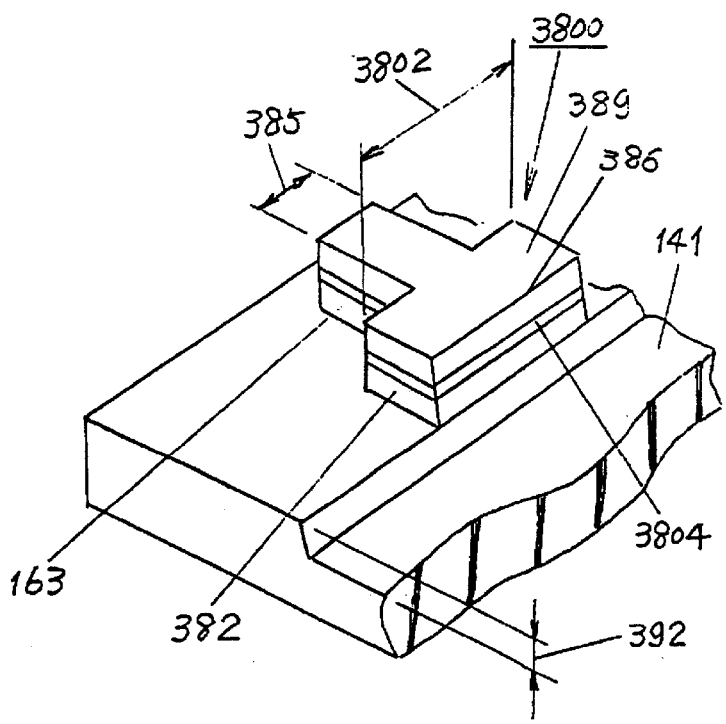

FIG. 41 shows an example of the combination of the ten-facet cubical structure 3800 and the shared shield section having a lowered surface with a first step difference 392. When the cubical structure 3800 is shaped in the present embodiment 7, the second surface is also dry-etched so that it is in a level that is lower with a step difference than the first surface on the upper surface of the shared shield section in an area behind the crossing line formed by the first surface and a plane containing the rear surface 386 of cubical structure 3800. Thus a certain specific head track width is formed by processing the layers altogether at once.

Figure 42:
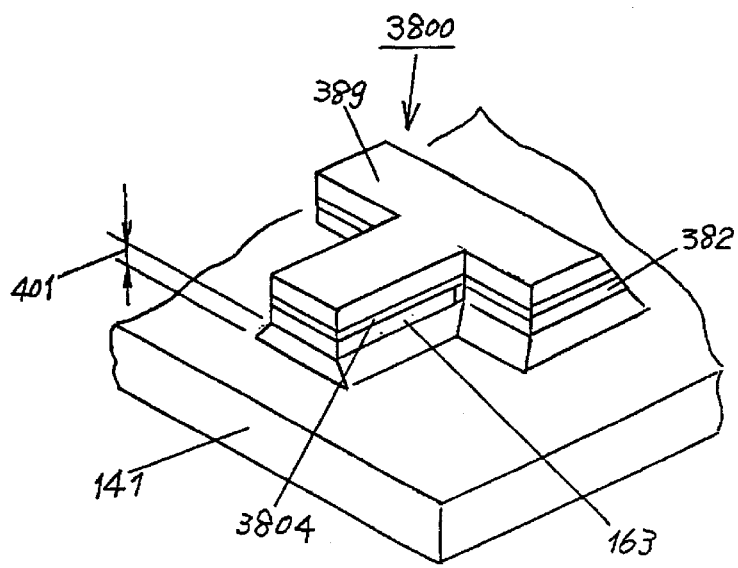

FIG. 42 shows an example of the combination of the cubical structure 3800 and the shared shield section having a second step difference 401. When the cubical structure 3800 is shaped in the present embodiment 7, a third surface is also formed by dry-etching the upper surface of the shared shield section in an area surrounding the bottom regions of the lower high Bs magnetic layer 163 and the insulating layer 382, which being constituent portion of the cubical structure 3800, so that the third surface is in a level that is lower than the first surface with a second step difference. Thus a certain specific head track width is formed.

Figure 43:
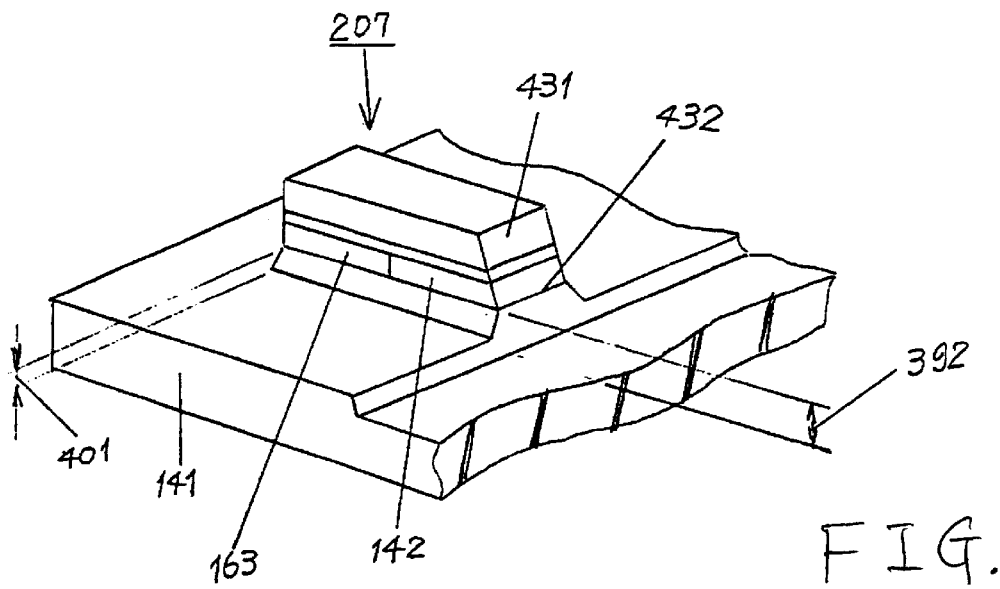

FIG. 43 shows an example of the combination of the six-facet cubical structure 207 and the shared shield section having lowered surfaces with the first step difference 392 and the second step difference 401. When the cubical structure 207 is shaped in the seventh process step of embodiment 6, also a second surface is dry-etched on the upper surface of the shared shield section at a level that is lower than a first surface with a first step difference in an area behind the crossing line 432 formed by the first surface and a plane containing the rear surface 431 of cubical structure 207, and a third surface on the upper surface of the shared shield section in an area outside the bottom regions of the lower high Bs magnetic layer 163 and the insulating layer 142, which being constituent part of the cubical structure 207, in the front, left and right directions, so that the third surface is in a level that is lower than the first surface with a second step difference. Thus a certain specific head track width is provided by processing the layers altogether at once.

Figure 44:
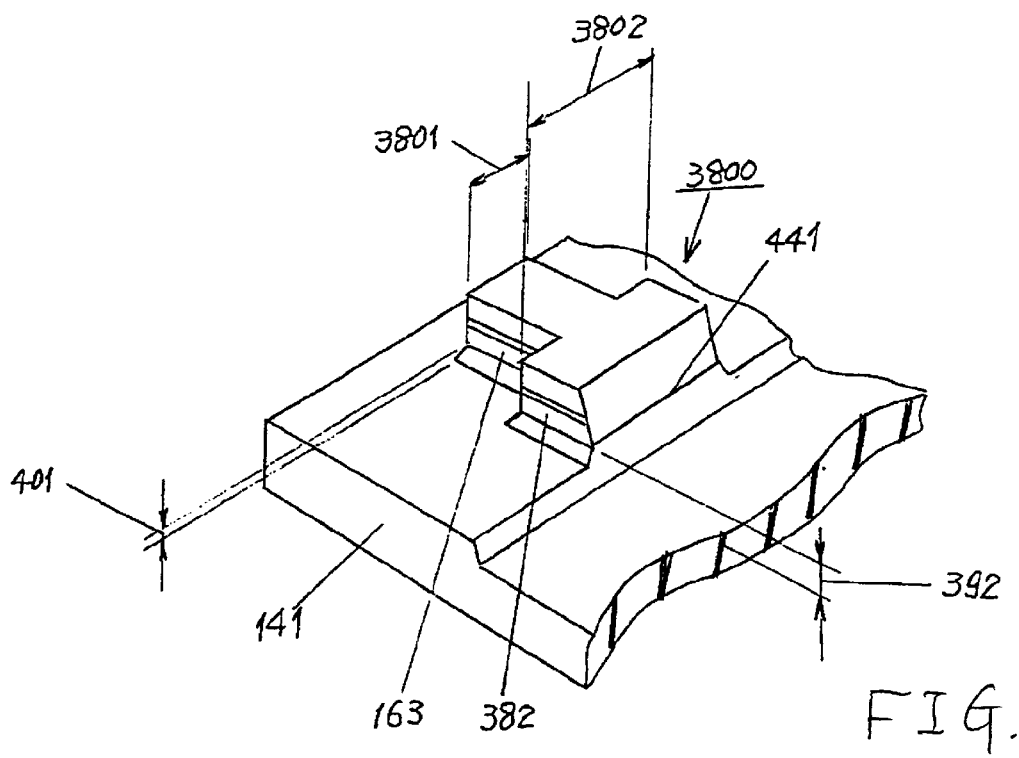

FIG. 44 shows an example of the combination of the cubical structure 3800 and the shared shield section having the first step difference 392 and the second step difference 401. When the cubical structure 3800 is shaped in the present embodiment 7, the upper surface of the shared shield section is also dry-etched so that a second surface is formed at a level that is lower than a first surface with a first step difference in an area behind the crossing line 441 formed by the first surface and a plane containing the rear surface 386 of cubical structure 3800, and a third surface in an area outside the bottom regions of the lower high Bs magnetic layer 163 and the insulating layer 142, which being constituent part of the cubical structure 3800, in the front, left and right directions to be in a lower level with a second step difference. Thus a certain specific head track width is provided by processing the layers altogether at once.

When the seventh process step of embodiment 6 is replaced with either one of the above-described four examples shown in FIG. 41–FIG. 44, the same effects as those of embodiment 6 are yielded, and a thin film magnetic head effective for the high density recording is provided.

Although the ten-facet cubical structure 3800 has been illustrated in FIG. 38, FIG. 41, FIG. 42 and FIG. 44 that its second left and right side surfaces are substantially parallel to each other, the side surfaces do not need to be disposed substantially parallel. Instead, the cubical structure may be shaped in such forms as illustrated in FIG. 8A or FIG. 8B.

The connecting surface between the first surface and the third surface is not limited to a flat surface. It may assume part of a cylindrical surface or other curvature.

(Embodiment 8)

Figure 45:
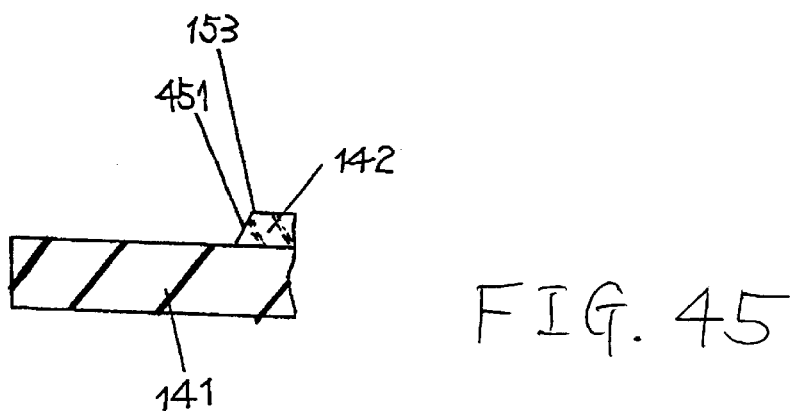
FIG. 45 is a cross sectional view showing the insulating layer of a thin film magnetic head in an eighth embodiment of the present invention.
Figure 46:
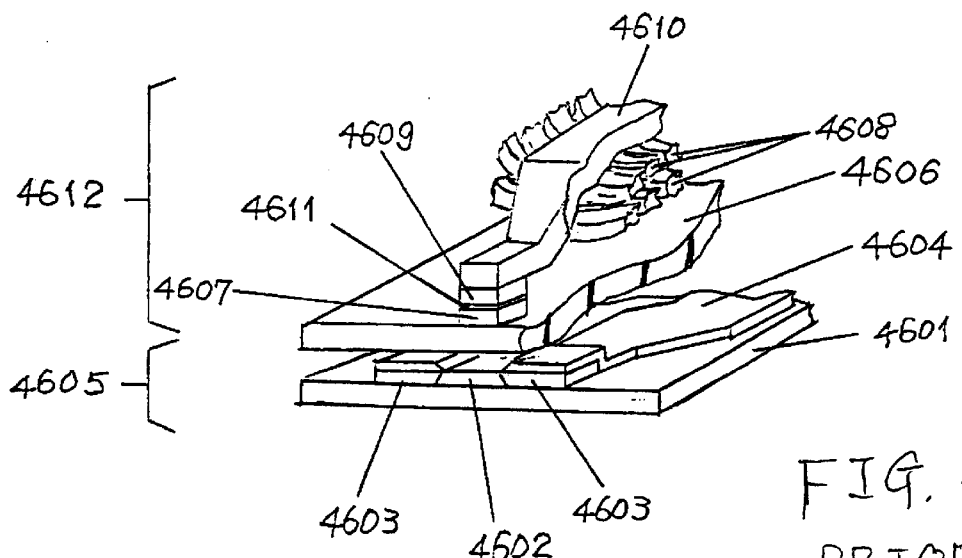
FIG. 46 is a perspective view of a conventional complex MR inductive head.
Figure 47:
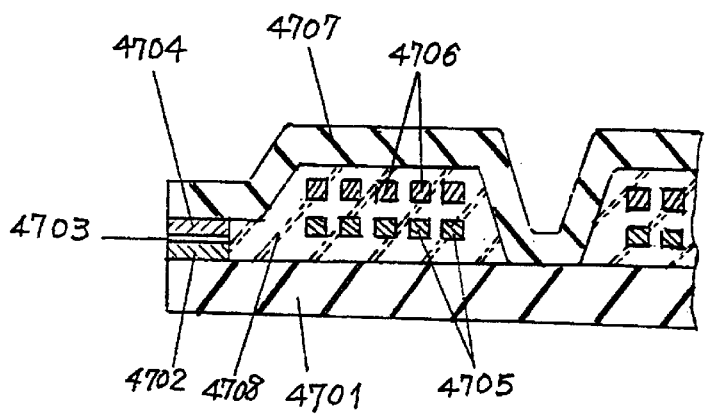
FIG. 47 is a cross sectional view showing the writing section of the complex head.

FIG. 45 is a cross sectional view showing an eighth exemplary embodiment of the present invention. The second step of embodiment 6 is replaced with a dry-etching process that removes the insulating layer 142 in a manner that the etched end face 451 is slanting relative to the upper surface of the shared shield section 141, while keeping the other processes as they are. After the polishing at the fourth step, the lower high Bs magnetic layer (not shown) is disposed serially in the front making contact to the end face 451; the hind end face of the lower high Bs magnetic layer making contact with the end face 451 is reverse-tapered. This configuration reduces leakage of the magnetic flux that occurs between the hind end face of lower high Bs magnetic layer and the upper high Bs magnetic layer (not shown). Thus a thin film magnetic head having an improved recording efficiency is provided.

Next, examples that can replace the second step of embodiment 6 are described.

One is, as shown in FIG. 10, dry-etching the insulating layer 102, which was formed at the first step, at the edge line 106 so that the edge line 106 is provided with an open portion 104 that is substantially identical to a certain specific head track width 103, which open portion 104 forming a V-shape cut towards inside, and the shared shield section including the V-shape cut is exposed. The rest of the steps of embodiment 6 are kept as they are. The same effects as in embodiment 6 are yielded in the present embodiments. Thus the lower high Bs magnetic layer assumes a pentagonal shape, where width of a tip end is identical to the head track width, while the opposite part is tapered. The broader width at the tip end enhances magnetic flux at the tip end, which contributes to provide a thin film magnetic head having an improved recording efficiency.

Another example for replacing the second step of embodiment 6 is dry-etching the insulating layer 142 so that the end face assumes a slant surface 451, as shown in FIG. 45, in at least the V-shape cut region. This configuration reduces leakage of the magnetic flux between the hind end face of lower high Bs magnetic layer and the upper high Bs magnetic layer, and improves the recording efficiency. The broader width of the lower high Bs magnetic layer at the tip end enhances magnetic flux at the tip end. Thus a thin film magnetic head having strong magnetic fields at the tip end is provided.

Although in embodiments 1–8 the rear surface (for example, the rear surface 203 in FIG. 20, the rear surface 386 in FIG. 38) formed of the respective rear end face of an upper write chip section (upper high Bs magnetic layer), a gap section (gap layer) and a front insulating layer (insulating layer) is apparently illustrated to be oblique to the upper surface of the shared shield section, it may of course take a substantially perpendicular stand to the upper surface of the shared shield section.

What is claimed is:

1. A thin film magnetic head comprising:

a lower magnetic pole including a shared shield section and a lower write chip section made of a high Bs magnetic layer disposed on an upper surface of said shared shield section at a tip end portion;

a gap section formed on an upper surface of said lower write chip;

an upper magnetic pole including an upper write chip section made of a high Bs magnetic layer provided on said gap section, opposing to said lower write chip section, and a yoke section made of a high ρ magnetic layer that makes contact in a part with said lower magnetic pole and coupled at a tip end portion with said upper write chip section; and a coil provided so that it winds around going through a space formed by said lower magnetic pole and said upper magnetic pole opposing to each other, within a region between a contact area, where said lower magnetic pole and said upper magnetic pole making contact, and said upper write chip section, also going through a space behind said yoke section, wherein said upper write chip section is longer in the direction of depth than said lower write chip section in the direction of depth.

2. The thin film magnetic head of claim 1, wherein a width of said yoke section at the portion connected with said upper write chip section is greater than a head track width constituted by said upper write chip section and said lower write chip section.

3. The thin film magnetic head of claim 1, wherein a front-end face of said yoke section connected with said upper write chip section is receding from a front-end face of said upper write chip section.

4. The thin film magnetic head of claim 1, wherein a width of said upper write chip section at a tip end is identical to a head track width constituted by said upper write chip section and said lower write chip section, while a width of said upper write chip section at a rear portion is greater than said head track width.

5. The thin film magnetic head of claim 1, wherein a length of said lower write chip in the direction of depth is smaller in an area having contact with said shared shield section than in an area having contact with said gap section.

6. The thin film magnetic head of claim 1, wherein said lower write chip section is shaped, at the vicinity of a tip end, with a couple of straight lines that are parallel to each other with a space identical to a head track width constituted by said upper write chip section and said lower write chip section, while said lower write chip section is tapered, at a rear end portion, towards the other end opposite to said tip end.

7. The thin film magnetic head of claim 1, wherein said shared shield section is hollowed in an area corresponding to said coil.

8. The thin film magnetic head of claim 1, wherein a surface of said shared shield section is provided with a stepped difference in level between an area making contact with said lower write chip section and an area at both left and right sides of said lower write chip section.

* * * * *